US011021376B2

(12) United States Patent
Johnson et al.

(10) Patent No.: US 11,021,376 B2
(45) Date of Patent: Jun. 1, 2021

(54) WATER NETWORK MONITOR, MONITORING SYSTEM AND METHOD

(71) Applicant: INTELLITECT WATER LTD, Romsey (GB)

(72) Inventors: Benjamin Ian Johnson, Romsey (GB); Alexander James Brown, Romsey (GB); Mark Duckworth, Romsey (GB)

(73) Assignee: INTELLITECT WATER LTD, Romsey Hampshire (GB)

( * ) Notice: Subject to any disclaimer, the term of this patent is extended or adjusted under 35 U.S.C. 154(b) by 0 days.

(21) Appl. No.: 16/956,786

(22) PCT Filed: Aug. 10, 2018

(86) PCT No.: PCT/GB2018/052280
§ 371 (c)(1),
(2) Date: Jun. 22, 2020

(87) PCT Pub. No.: WO2019/122798
PCT Pub. Date: Jun. 27, 2019

(65) Prior Publication Data
US 2020/0331772 A1    Oct. 22, 2020

(30) Foreign Application Priority Data
Dec. 20, 2017  (GB) ..................... 1721435

(51) Int. Cl.
*C02F 1/00*    (2006.01)
*G06K 9/62*    (2006.01)
(Continued)

(52) U.S. Cl.
CPC ............ *C02F 1/008* (2013.01); *G06K 9/6284* (2013.01); *G06N 7/005* (2013.01);
(Continued)

(58) Field of Classification Search
CPC ................... G06Q 50/06; G06N 7/005; G06F 11/0766–0787; G06K 9/6284;
(Continued)

(56) References Cited

U.S. PATENT DOCUMENTS 8,341,106 B1    12/2012  Scolnicov et al.
2019/0311282 A1*  10/2019  Lospinoso ............. G06Q 30/00

FOREIGN PATENT DOCUMENTS

CN    106872657 A    6/2017
CN    107402547 A    11/2017
JP    2017002554 A    1/2017

OTHER PUBLICATIONS

Corresponding International Patent Application No. PCT/GB2018/052280, International Search Report, dated Jan. 22, 2019.
(Continued)

*Primary Examiner* — Terry K Cecil
(74) *Attorney, Agent, or Firm* — Cooper Legal Group, LLC

(57) ABSTRACT

A water network monitor, monitoring system and method" A water network monitor, monitoring system and method comprising: at least one sensor operable to sense one or more parameters of a water network; and an analyser to analyse data points over time from the water network by the at least one sensor, the analyser having an input comprising the data points recorded over time from the water network and an output comprising an event probability P(event) that an event has occurred which affects the water network from which the data points were recorded, the analyser comprising: an outlier detector to determine a measure of abnormality (D) from an outlier detection algorithm for each of the data points; and an outlier decay discriminator (ODD) to calculate an outlier probability (Po) for each of the data points based on each data points measure of abnormality (D), wherein the outlier probability is decayed over time, the
(Continued)

output of the ODD comprising an event probability P(event), wherein P(event) is based on the decayed outlier probability.

21 Claims, 11 Drawing Sheets

(51) Int. Cl.
  *G06N 7/00* (2006.01)
  *G06Q 50/06* (2012.01)
(52) U.S. Cl.
  CPC ...... *C02F 2209/02* (2013.01); *C02F 2209/03* (2013.01); *C02F 2209/04* (2013.01); *C02F 2209/05* (2013.01); *C02F 2209/06* (2013.01); *C02F 2209/11* (2013.01); *C02F 2209/14* (2013.01); *C02F 2209/15* (2013.01); *C02F 2209/20* (2013.01); *C02F 2209/22* (2013.01); *C02F 2209/29* (2013.01); *C02F 2209/36* (2013.01); *C02F 2209/40* (2013.01); *C02F 2307/14* (2013.01); *G06Q 50/06* (2013.01)

(58) Field of Classification Search
  CPC ..... G06G 50/06; C02F 1/008; C02F 2209/02; C02F 2209/03; C02F 2209/04; C02F 2209/05; C02F 2209/06; C02F 2209/11; C02F 2209/14; C02F 2209/15; C02F 2209/20; C02F 2209/22; C02F 2209/29; C02F 2209/36; C02F 2209/40; C02F 2307/14
  See application file for complete search history.

(56) References Cited

OTHER PUBLICATIONS

Corresponding International Patent Application No. PCT/GB2018/052280, Written Opinion of the International Searching Authority, dated Jan. 22, 2019.
D.B. Hart, et al., "CANARY User's Manual Version 4.3.2", United States Environmental Protection Agency, pp. 1-72, Sep. 2012, https://cfpub.epa.gov/si /si_public_file_download.cfm?p_download_id=513254&Lab=NH SRC.

* cited by examiner

WATER NETWORK MONITOR, MONITORING SYSTEM AND METHOD

BACKGROUND

This invention relates to a water network monitor, monitoring system and method.

A water network is a water supply and distribution network of hydrological and hydraulic components. Components of the network can include: a drainage basin; a raw water collection point where water accumulates, such as a lake, a river, or groundwater from an underground aquifer; conduits such as aqueducts, covered tunnels or underground water pipes; water treatment or purification facilities; water storage facilities such as reservoirs, water tanks, water towers, cisterns and pressure vessels; water pressurising components such as pumping stations; a pipe network for distribution of water to the consumers (private houses, industrial or commercial establishments) and usage points such as fire hydrants.

A sewerage system downstream of the water consumers is a separate part of the water supply system and may be monitored independently of the system upstream of the water consumers.

High quality water is supplied into the water network under controlled conditions but once the water enters the water network the ability to monitor its quality and other parameters is lost.

The quality of the water or other measures may alter along the network, particularly on the way to customers. Any changes in water quality or other measures occur as a result of events which occur in, along and around the network. Events may occur outside the water network system but the effects of that event are felt by the water network system and those effects are detectable through changes in the parameters of the water network system.

The events may be inputs into the network such as leakages into the network such as pollution, industrial waste, effluent or agricultural run-off system. Discontinuities in the network such as burst pipes or leaks can reduce water pressure and allow contaminants into the network. Events would also include a failure in the functionality of a pressure system such as a malfunction in a pumping station. Other examples include failure of dosing stations, the introduction of stale water from another source and intentional tampering with the water system (e.g. terrorist action). It is important to monitor the water quality and other measures in the water network and in response to detected anomalies driven by events to alert and/or take action to remedy the position. Events also include pre-events. Pre-events occur before another event and are indicative (or predictive) of a following event.

The CANARY water quality event detection software has been developed at Sandia National Laboratories in collaboration with the EPA's National Homeland Security Research Center to provide both off-line and real-time analysis tools to detect anomalous changes from the baseline and indicate possible contamination in a water distribution system.

REFERENCE

Hart, D. B.; Klise, K. A.; Vugrin, E. D.; McKenna, S. A.; Wilson, M. CANARY user's manual version 4.3.2 EPA/600/R-08/040B. U.S. Environmental Protection Agency, Office of Research and Development, National Homeland Security Research Center, Cincinnati, Ohio, 2012.

Aspects of the present invention provide a water network monitoring system having the features of the accompanying claims.

One aspect of the invention provides a water network monitoring system comprising: at least one sensor operable to sense one or more parameters of a water network; and an analyser to analyse data points recorded over time from the water network by the at least one sensor, the analyser having an input comprising the data points recorded over time from the water network and an output comprising an event probability $P_{(event)}$ that an event has occurred which affects the water network from which the data points were recorded, the analyser comprising: an outlier detector to determine a measure of abnormality (D) from an outlier detection algorithm for each of the data points; an outlier decay discriminator (ODD) to calculate an outlier probability ($P_O$) for each of the data points based on each data point's measure of abnormality (D), wherein the outlier probability is decayed over time, the output of the ODD comprising an event probability $P_{(event)}$, wherein $P_{(event)}$ is based on the decayed outlier probability.

Another aspect of the invention provides system to analyse data points recorded over time from a water network system, the analyser having an input comprising the data points recorded over time from the water network system and an output comprising an event probability $P_{(event)}$ that an event has occurred which affects the water network system from which the data points were recorded, the analyser comprising: an outlier detector to determine a measure of abnormality (D) from an outlier detection algorithm for each of the data points; an outlier decay discriminator (ODD) to calculate an outlier probability ($P_O$) for each of the data points based on each data point's measure of abnormality (D), wherein the outlier probability is decayed over time, the output of the ODD comprising an event probability $P_{(event)}$, wherein $P_{(event)}$ is based on the decayed outlier probability.

An aspect of the invention provides a monitoring system to analyse data points recorded over time from a system, the analyser having an input comprising the data points recorded over time from the system and an output comprising an event probability $PP_{(event)}$ that an event has occurred which affects the system from which the data points were recorded, the analyser comprising: an outlier detector to determine a measure of abnormality (D) from an outlier detection algorithm for each of the data points; an outlier decay discriminator (ODD) to calculate an outlier probability ($P_O$) for each of the data points based on each data point's measure of abnormality (D), wherein the outlier probability is decayed over time, the output of the ODD comprising an event probability $P_{(event)}$ One aspect of the invention provides a method of monitoring a water network system comprising: recording data points over time from a water network system, determining a measure of abnormality (D) from an outlier detection algorithm for each of the recorded data points; calculating an outlier probability ($P_o$) for each of the recorded data points based on each data point's measure of abnormality (D), decaying the outlier probability over time; and outputting an event probability $P_{(event)}$ that an event has occurred which affects the water network system from which the data points were recorded, wherein P(event) is based on the decayed outlier probability.

A further aspect of the invention provides a computer readable medium carrying a set of instructions for carrying out the method.

Another aspect of the invention provides a baseline change detector for monitoring a water network system, the baseline change detector comprising:

an analyser to analyse data points recorded over time from a water network system, the analyser having an input comprising the data points recorded over time from the water network system and an output comprising a baseline change indicator; calculating the probability of a baseline change based on monitoring data points over time comprising one or more of: the inter-quartile range (IQR) of the data points; the inter-quartile range (IQR) of the gradient of the data points; and/or the standard deviation of the data points, wherein the baseline change probability comprises a probability calculated from a combination of the time and one or more of the standard deviation, the gradient IQR and/or the IQR.

A further aspect of the invention provides the claimed water monitoring system in combination with the claimed baseline detector.

Another aspect of the invention provides a water network system incorporating the claimed analyser and/or the claimed baseline detector.

DESCRIPTION OF INVENTION

In order that the present invention may be more readily understood, embodiments of the invention are now described, by way of example, with reference to the accompanying drawings, in which.

Figure 1:
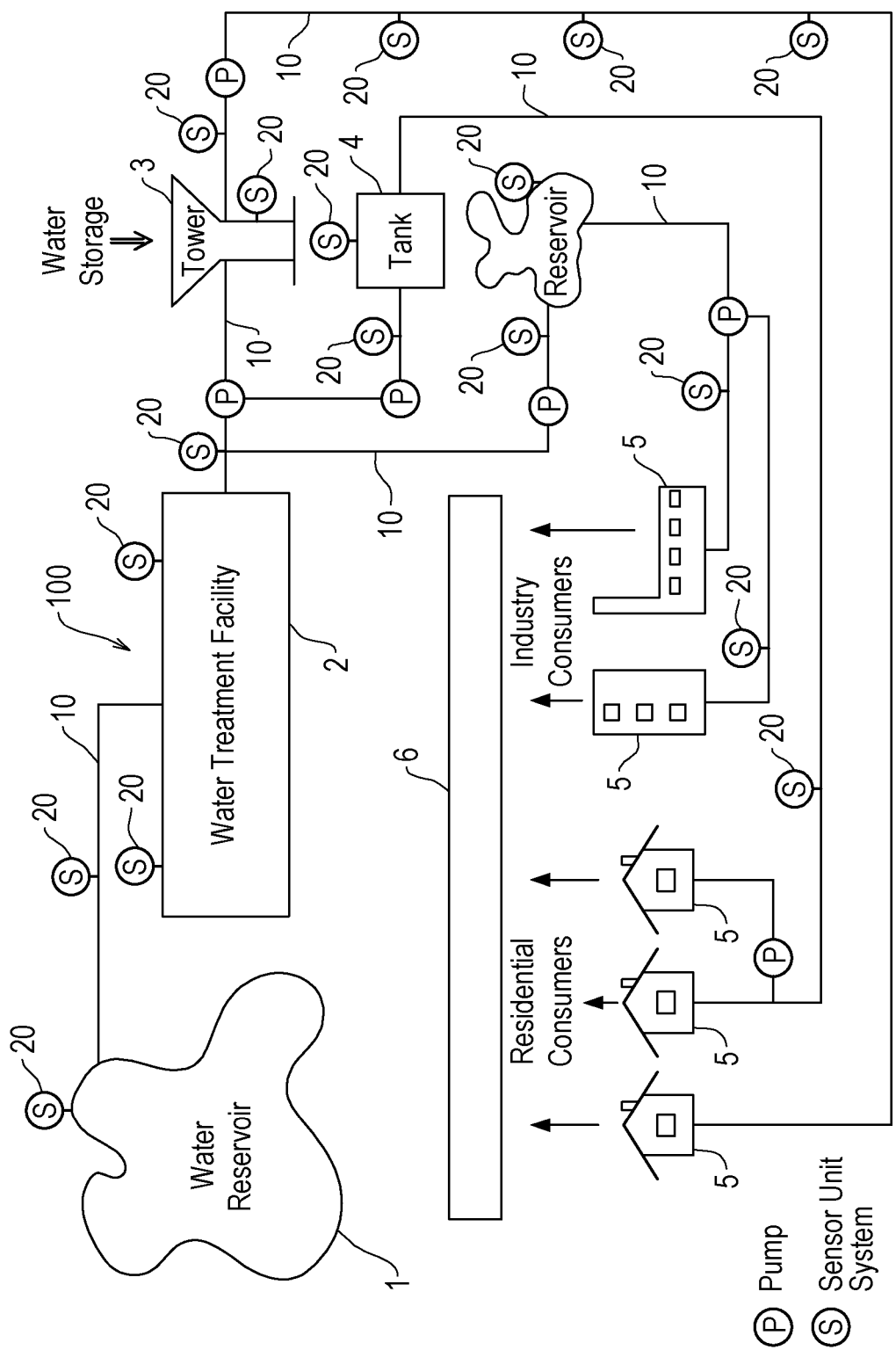
FIG. 1 is a schematic representation of a water network system monitored by a sensor system embodying the present invention.
Figure 2:
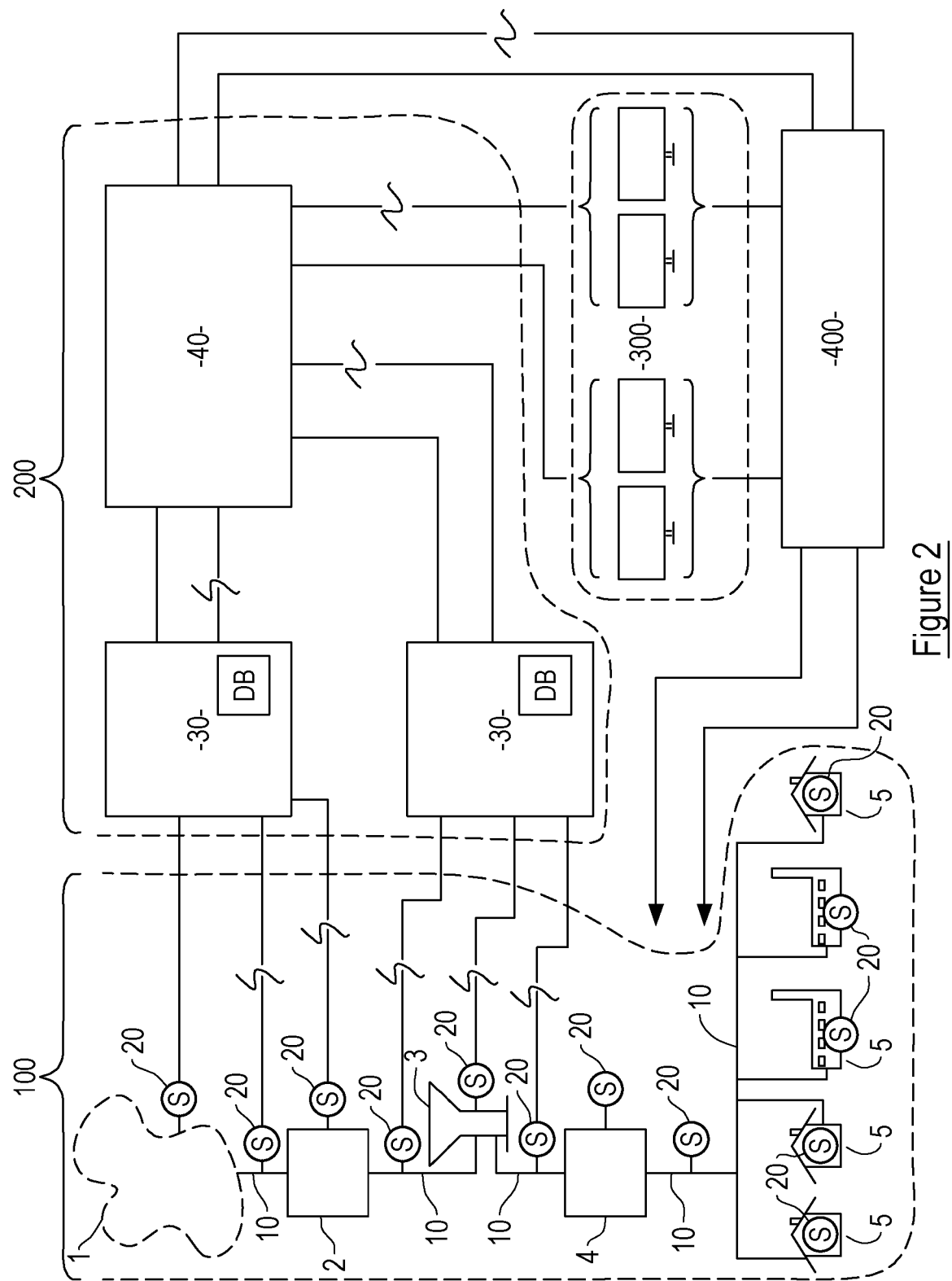
FIG. 2 is a schematic representation of the water network system and the sensor system of FIG. 1 and a monitoring system embodying the present invention.
Figure 3:
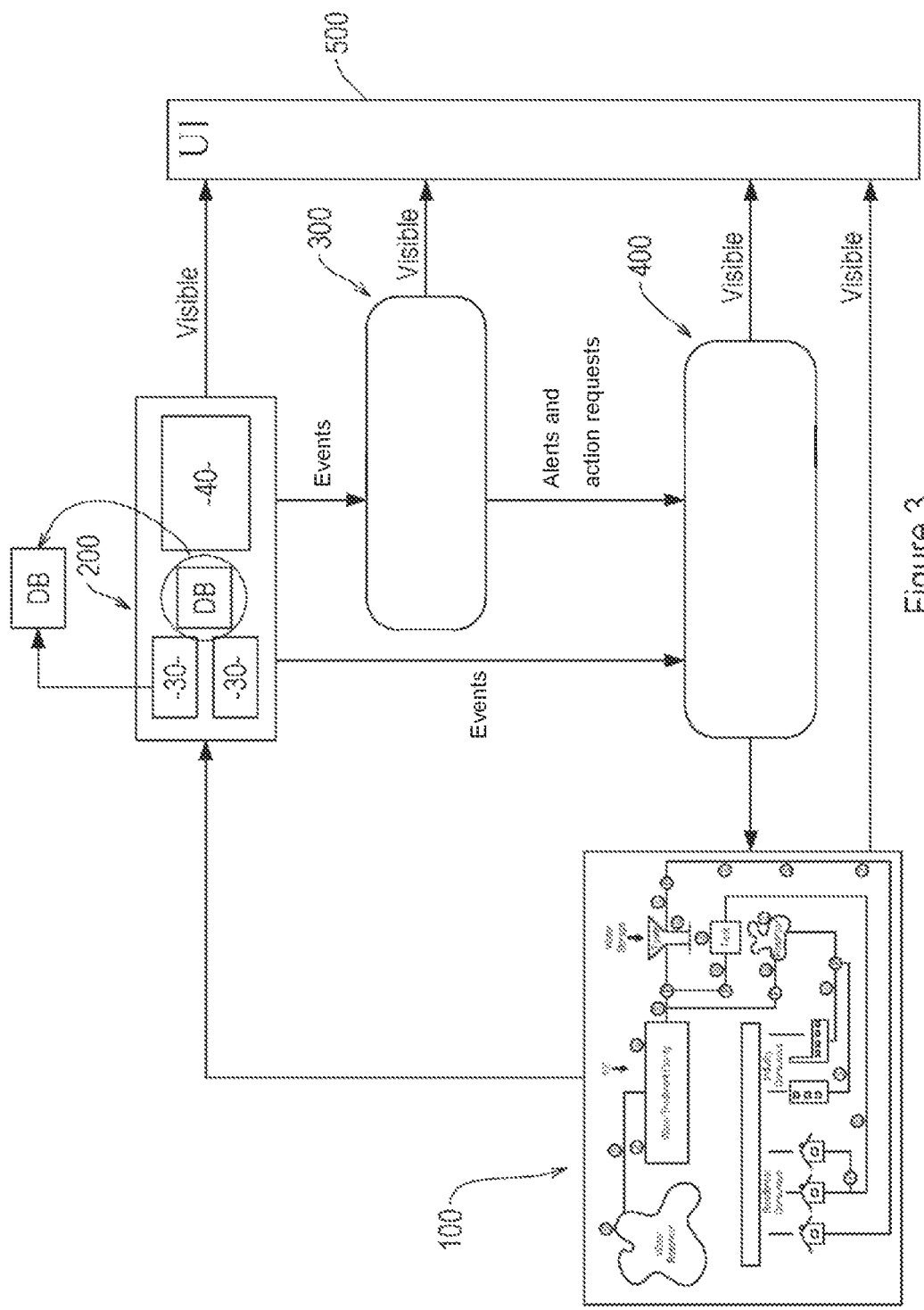
FIG. 3 is a schematic representation of the water network monitoring system embodying the present invention.

Referring to FIGS. 1 to 3, a water network system 100 has multiple components distributed over a large geographic space. The water quality in the water network and the health of the water network and its component parts are monitored by a water network monitor which comprises: an event detection system 200; a monitoring system 300; an alert and action system 400; and a user interface 500.

The event detection system 200 embodying the present invention takes sensed data from the water network system 100 and analyses the data to determine if events or pre-events are occurring in the water network system 100. The monitoring system 300 embodying the present invention reviews the detected events or pre-events and provides alerts that an event or a pre-event is occurring or is likely to occur. The alert and action system 400 receives the alerts that an event or a pre-event is occurring or is likely to occur and if the effects of the event warrant attention or action, the alert and action system 400: actuates, for example, equipment in the water network system 100 to remedy the situation; and/or issues communications, notices, postings, news alerts, warnings and/or service calls with suggested action points. The user interface 500 gives a network operator access to and visibility of the systems 100,200,300,400.

The systems 200,300,400,500 which make up the water network monitoring system as a whole are shown in FIGS. 1, 2 and 3 as discrete and independent systems which distinguish from one another by the function or functions that they perform. The data gathering, processing, analysis, communication, monitoring, actions and user interfaces that are performed by the overall system are described as being performed by specific functional blocks or modules within the system.

Different embodiments of the invention can be implemented where one or more or all of the functions performed by the event detection system 200; the monitoring system 300; the alert and action system 400; and the user interface 500 are performed across a fully distributed system or a cloud-based system or implemented within a single piece of hardware. Further, the functions performed by the respective systems can be performed by other or the same parts of the system. For example, the monitoring system 300 may be omitted and its functions performed by the event detection system 200 or the alert and action system 400.

The described embodiments, as shown in at least FIGS. 1 to 3, which have modules which perform the event detection and analysis; monitoring; alert and action systems; and the user interface functionality represent embodiments which lie between the two extremes of a fully distributed system or a cloud-based system and a single piece of hardware responsible for all functionality. Both of these extremes are envisaged within the scope of the invention.

FIGS. 1 and 2 show the water network system 100 comprising a series of interconnected water network components: a reservoir 1, a water treatment facility 2, a water tower 3, a water tank 4 and a series of domestic and industrial water consumer premises 5, all of which are inter-connected by a pipe network of conduits 10. A sewerage system 6 is shown in FIG. 1 which is independent of the water network system, per se, but which can be monitored in the same or a similar manner to the water network system 100.

A plurality of sensors 20 are distributed around the water network system 100 in and at the components of the network, usually in the conduits 10.

Each sensor unit 20 is a multi-sensor device which may be inserted directly or partially into the water pipes 10 or other network components and is operable to sense one or more parameters of the water network system 100 at the sensor unit's geo-location.

The sensor units 20 communicate with an event detection system 200—there is a wired or wireless communication link between the sensor units 20 and one or more data servers 30 which are part of the event detection system 200. In some examples, the data server(s) 30 initiates the connection. In other examples, the sensor units 20 initiate the connection.

The sensor units 20 report their readings of the sensed parameters, either unprocessed, raw or processed by the sensor unit 20 to the event detection system 200. The data servers 30 record the sensed parameters in a database DB which may be mirrored across the data servers, distributed across the data servers or held on one data server with remote back up or any combination of these. Alternatively, or in addition, the database DB may be held remotely on an independent server which is populated from the data servers 30. The data server(s) 30 may be part of or independent from an event detection analyser 40 which is responsible for reviewing the data produced by the sensor units 20.

In other examples, the system is configured without a database in the conventional form. For example, a number of data points are stored only in a temporary memory (RAM) on a data server 30 and are still accessible by the detection analyser. Further, an event detector can poll a remote sensor 20 and read its current value and utilise that data in its analysis. Such configurations do not require a database, as such.

In some examples, the analysis and/or processing is carried out on the sensors or on the data loggers attached to the sensors. These examples may or may not utilise a database. In such examples, the sensors can communicate directly with the user interface.

The vast amount of data produced by the sensor units 20 in the water network system 100 can be difficult to interpret or may simply appear not to be significant in its raw form. The event detection analyser 40 analyses this data using event detection algorithms so that anomalous data sets can be identified in real-time to alert that an event may be about to occur, may be in progress or has occurred and preferably and importantly also minimises the occurrence of false alerts when an event is not in progress—minimising false positives. In a water network system, an event could be planned maintenance that generates a disturbance or a change in turbidity or disinfection levels in the water or even a pipe break.

The event may have a certainty level or probability associated with it so that it does not become a reportable event until a certain likelihood level is exceeded or a certain probability achieved. An event is an indication that there has been some change affecting the characteristics of the water network system (or more usually, the change does not affect the entire water network system 100 but is a local change affecting a particular geo-location or geo-area of the water network system). The change may be external to the water network system such as contamination or leaching of fertiliser or other chemicals from agricultural run-off occurring outside the system but causing effects felt inside the system. An agricultural run-off containing fertiliser, for example, could accelerate pipe wall growth, thus increasing pipe roughness, restricting the pipe diameter and slowing the flow rate. Extreme climatic conditions, although unlikely in many geographic areas, such as a freeze, may present symptoms in the water network system 100 causing pipes to freeze and become partially restricted or fully blocked. Pipe restrictions will affect water flow rates. Water flow rates at various stations around the water network system are sensed by the sensor units—water flow rate is an example of a sensed parameter.

There are many potential issues facing a water network on a day-to-day basis and various events may individually or in combination merit an alert to the water network operator.

An alert may be able to provide an indication of the nature of the event that is suspected of occurring or has occurred. The alerts provide a useful technical indication of the status of the water network system and are occasioned by events or pre-events occurring in the water network system or events or pre-events which are external to the water network system but which have an influence on the water network system. The likelihood of events occurring is signalled by changes in one or more of the water network system parameters. As well as providing a feed to the monitoring system, the event detection system analyses the sensed parameter data to provide a greater understanding of the water network. This additional analysis enables the data to be more easily interpreted by the water network operator or service provider and can be used to calculate or determine information that would otherwise require large amounts of manual processing. For example, the data processed by the event detection system can be used to determine zones of the network which are likely to be particularly susceptible to wear and erosion and can be used to calculate timelines for recommended service or re-lining operations.

Figure 7:
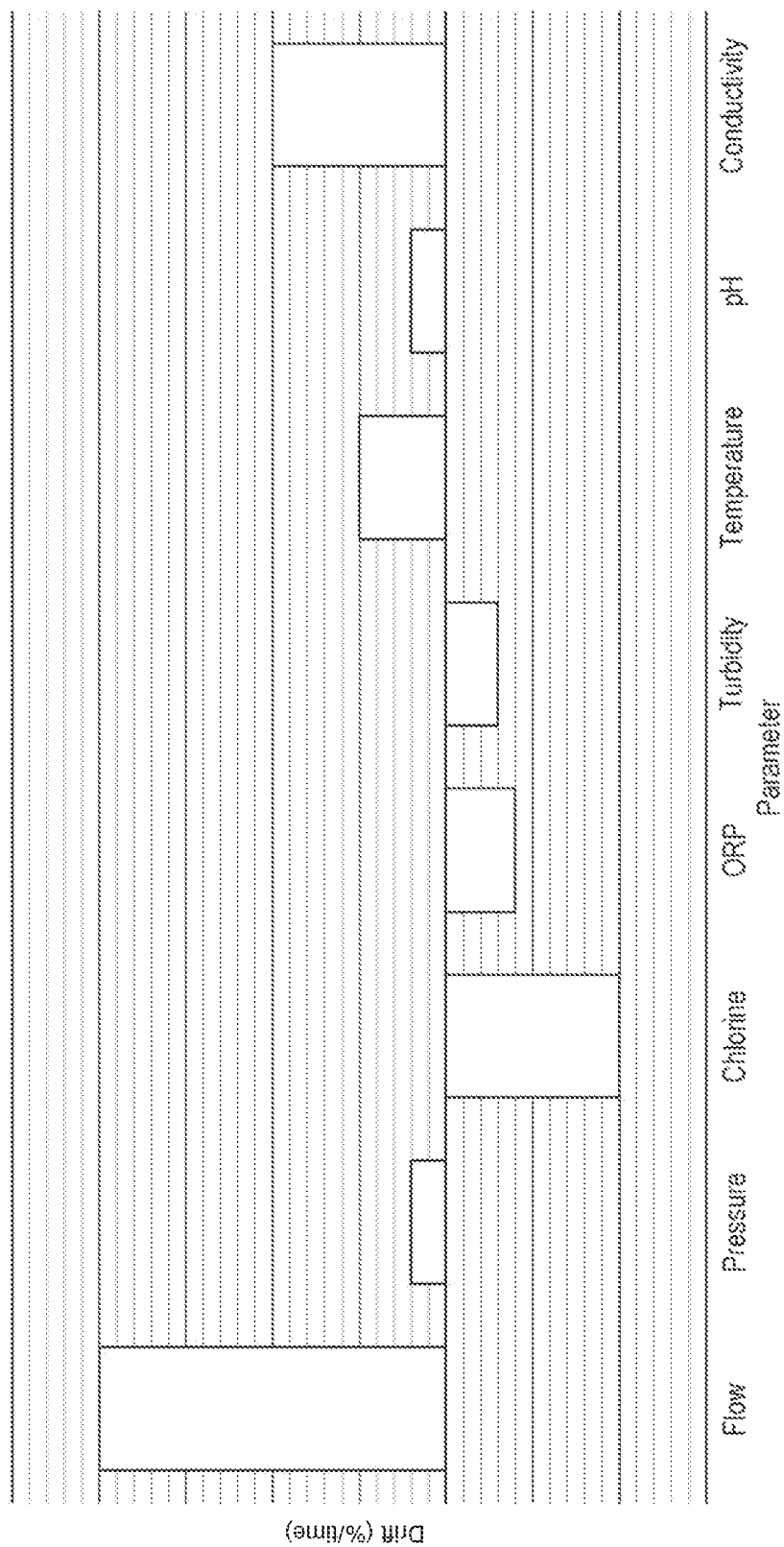
FIG. 7 is an illustration of an "at-a-glance" rendering of data generated by embodiments of the invention.
Figure 8:
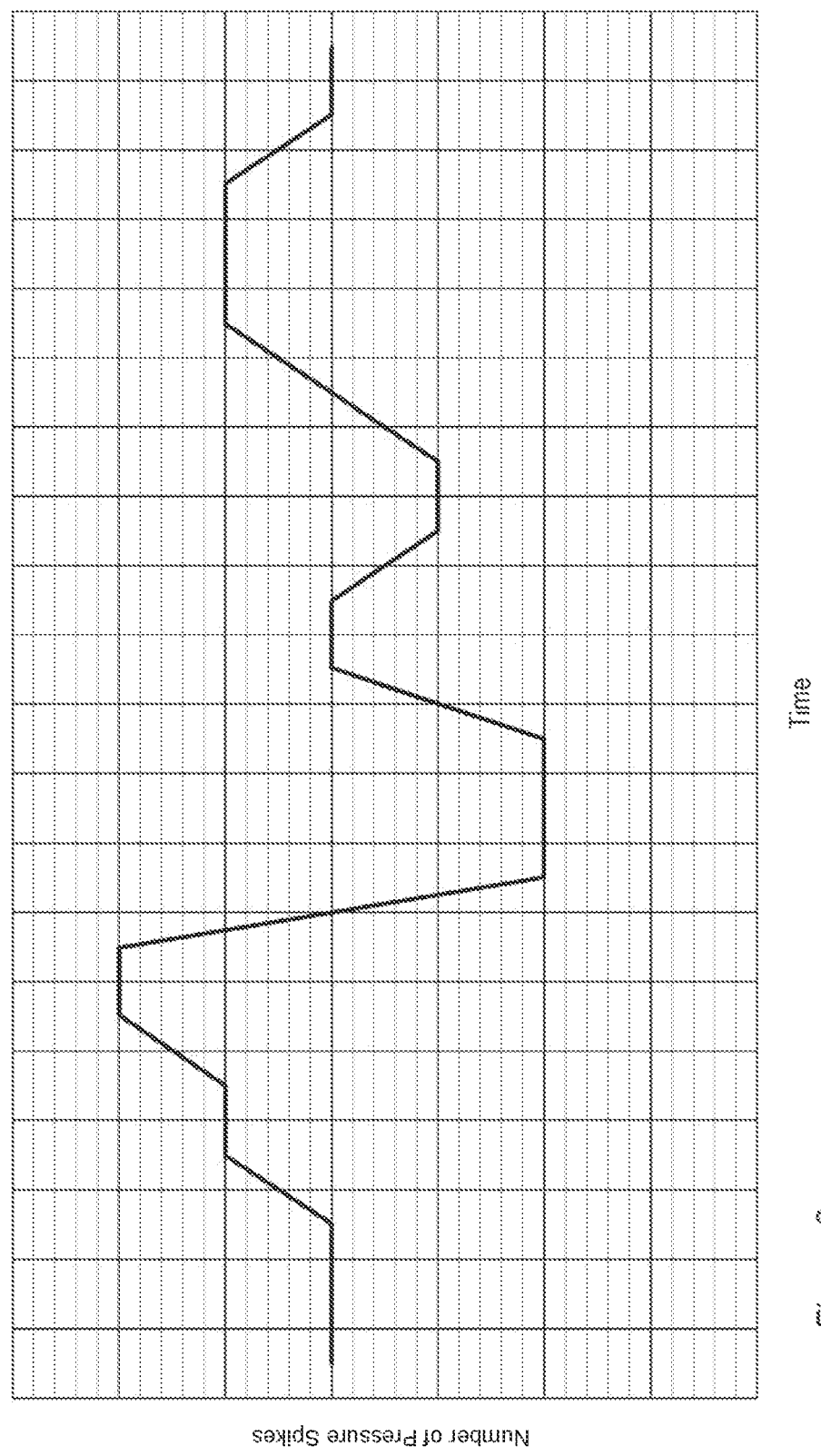
FIG. 8 is an illustration of another "at-a-glance" rendering of data generated by embodiments of the invention.

As well as detecting events, the event detection analyser 40 processes the sensed data into easy to interpret formats. This gives water network operators the information needed to manage the network in an accessible and intuitive form meaning that the network and its status can be better understood at a glance. FIGS. 7 and 8 are two examples of "at-a-glance" visualisations, created from examples of the present invention:

FIG. 7 shows the current drift of the parameters measured over a period of time. The additional analysis produced by the event detection analyser is the rate of drift. From this view, the users can easily see which parameters might be drifting due to causes such as bio-film growth, which may gradually reduce chlorine, or pipe deterioration, which may see a drift in flow or pressure depending on the position of the sensor relative to the deterioration.

FIG. 8 shows the number of pressure spikes (large, rapid changes in pressure) that have occurred over a period of time. Pressure spikes can indicate areas of the network that may be prone to failure due to the additional stresses they are under. Consequently, some water network companies actively put in place programmes to try to reduce the number of pressure spikes, this graph therefore gives them an at-a-glance view of whether these measures might be helping to reduce the number of spikes. Also, this view can help indicate whether certain sections of the network are under greater stress than others, thus aiding with maintenance scheduling.

When the event detection system 200 identifies a new event or pre-event, then this passes to the monitoring system 300 which reviews the detected events or pre-events and provides alerts that an event or a pre-event is occurring or is likely to occur. The event may be an, indication that a further event is likely to occur.

An alert and action system 400 receives the alerts that an event or a pre-event is occurring or is likely to occur and, if there is a determination that the effects of the event warrant attention or action, then the alert and action system 400 can actuate equipment in the water network system 100 to remedy the situation and/or issue communications, notices, postings, news alerts, warnings and/or accelerating or rescheduling maintenance and/or allocating service calls with suggested action points. For example, the alert and action system 400 can operate pumps around the water network system to redistribute water from one region of the network to another to relieve the burden on certain zones. Alternatively, or in addition, the alert and action system 400 can direct alerts, notifications or communications to third party service providers to take appropriate maintenance or service action. Action can include taking action on elements of the water network system or taking action on elements that affect the water network system—for example, altering ground works around a water network component. As shown in FIG. 3, such action closes the feedback loop comprising the water network system 100, the event detection system 200, the monitoring system 300 and the alert and action system 400.

In some cases, a particular event identified by the event detection system may be of sufficient note that it is not necessary to pass the event to the monitoring system 300 for evaluation whether an alert or action is required. In such instances, the event is treated as an alert in its own right and is communicated directly to the alert and action system. The event might be that a pump has stopped working and the alert and action system 400 would schedule immediate maintenance/repair for the pump.

A user interface 500 such as a web browser can access and view the results of the data analysis performed in the event detection system 200 along with the measurements (sensed parameters). The user interface 500 provides the network operator and other parties visibility of all aspects of the system: sensed parameters from the sensor units 20 and other components of the water network system 100; events and at-a-glance visualisations of network data from the event detection system 200; alerts from the monitoring system 300; and updates and actions from the alert and action system 400.

The user interface 500 can be configured as a desktop-based application or an API. The user interface can also be configured as a dedicated piece of hardware/firmware/software.

The Database

In this example, the database DB is a MySQL database. In other examples, any other form of database would be appropriate, as would a shared file storage system. Embodiments of the invention gather data from the database DB and report back to the same database DB after analysis has taken place. The database DB is structured to take any number of inputs from any number of sensor units 20 or other devices or instruments via a table containing the sensed data for any given date time value, sensor id and sensed value. This table can be a structured as either a flat table with an individual column per parameter and a row representing a sensor ID and a date time. Or a key-value based table whereby each row represents a single measurement and the type is indicated via the key.

Sensor Units

Each sensor unit 20 is a sensor device, preferably a multi-sensor device, capable of measuring and/or monitoring one or more parameters which may be inserted directly or partially into the water pipes 10 or other network components. A sensor unit 20 has an array of sensors for monitoring a plurality of parameters which are sensed to determine and monitor water quality. The parameters sensed by each sensor unit 20 are set out in Table I. Further parameters of the water/water network may be sensed and fewer parameters may be sensed as a selection from those listed at Table I. The listed parameters are not exclusive. Other parameters that can be sensed, measured and/or monitored are, for example, flow direction and levels of ammonia, ammonium, nitrates and fluorides. Other species of chlorine (trichloramine, dichloramine) and/or chlorine dioxide can also be monitored.

The ranges for the parameters given in Table I are "usual" ranges that a water network in Northern Europe would be expected to experience. The "usual" range for a respective parameter alters in response to various factors including: continental geo-location, localities, climates and seasons. Other factors include the manner in which the network is managed such as the disinfectant (i.e. chlorine, chlorine dioxide etc.) used, or the way in which the water is extracted, groundwater aquifers, rivers, reservoirs, desalination of salt water.

It is in the common general knowledge how to implement a sensor unit capable of sensing at least the parameters set out in Table I. An example of an available sensor unit is the Intellisonde™ inline probe which can monitor in real-time eleven different water network "operating" parameters. Preferably, all the readings from the sensors are in SI units (or variations of) for the parameters set out in Table I.

TABLE I

| Parameter | Usual range in a water network |
| --- | --- |
| Temperature | 7-20° C. (up to 50° C. in some countries) |
| Flow (volume or speed) | 0.01-1 m/s |
| pH | 7-8.5 |
| Oxidation Reduction Potential (ORP) | 300-800 mV |
| Conductivity | 300-800 µS/cm |
| Turbidity | 0-4 NTU |
| Free Chlorine | 0.02-1.2 mg/l |
| Monochloramine | 0.02-1.2 mg/l |
| Dissolved Oxygen | 70-120% |
| Pressure | 1-11 bar |

Parameters that can be measured, monitored and/or sensed include but are not limited to any one of or any combination of: Temperature, Flow, pH, ORP, Conductivity, Turbidity, Free Cl, Mono Cl, Dissolved Oxygen, Pressure, fluoride, nitrate, nitrite, ammonia/ammonium, total chlorine, chlorine dioxide, chloride, chlorite, chlorine, Iron, manganese, Arsenic, Copper, Cyanide, Lead, Nickel, Mercury, TOC, TIC, biCarbonate Hardness, TDS, Bio-organisms such as *E coli, streptococcus* (bacteria, parasites), Biofilm, *cryptosporidium*, Radioactivity.

The sensor units 20 do not need to be identical to one another and do not need to be multi-sensors. The sensor units 20 can include single-parameter dedicated sensors. Conveniently, the sensor units can be located "in-line", i.e. in-pipe and can also be incorporated in the respective components of the water network. Sensor units 20 can also be outside of the network per se and fed with samples of the water from a known location or component of the water network. This can be done with auto-sampling, a mechanism whereby a discrete sample is taken from the pipe and analysed before being disposed. An alternative mechanism uses flow cells, whereby a small feed from the pipe continually flows past a sensor and the water is then either returned to the pipe or disposed of. Any site or geo-location can have multiple readings (sensed parameters) associated with it from one or more sensor units 20 or devices. One site could have a single sensor or device such as a mag-flow meter or the site could also have multiple sensed parameters if the sensor unit 20 is a multi-sensor unit such as an Intellisonde™ probe for example.

The sensor units 20 can carry out some level of processing of the sensed data. The sensor units 20 report sensor readings of the sensed parameters, either unprocessed, raw or processed (and mixtures thereof) to the data servers 30 of the event detection system 200.

The sensor unit 20 includes a communication link, which may be wired or wireless, to one or more data servers 30 which are usually remote from the sensors 20. The sensor units 20 each have a unique identifier and the geo-location of each sensor 20 in the network is logged against its unique identifier in the database DB. The event detection system can see the geographical grouping of sensor inputs coming from a part of a water network such as being located in a branch of the network, downstream of a water reservoir or a pumping station, an industrial outflow zone or a water treatment location. Systems embodying the invention use an event detection point (EDP) format to decouple geo-locations from sensor units 20, thus allowing sensors to be moved without difficulty, provided the link-tables in the database DB are updated in the process. The system ties to the EDPs to analyse the data for that geo-location. Communication between the system analysing different EDPs is possible under the current structure. The use of an EDP is not essential and other mechanisms can be used, such as: having the system tied to sensor units 20 rather than a specific geo-location; or reprogramming the sensor units 20 to report to the database with a different ID when the geo-location is changed.

Event Detection System

The sensed parameters from each sensor unit 20 are logged in the database DB either on the data servers 30 or by the data servers 30 associated with the event detection system 200.

The event detection analyser has a series of modules which are each capable of raising an event—i.e. providing an output that a critical probability has been reached that a particular event has occurred. If such a critical probability is reached, then an event is raised.

The data received from a particular sensor unit 20 is known to relate to a particular geo-location and the data can be processed by the event detection system 200 to detect events and calculate useful metrics and visualisations about the water quality in the water network system 100 at that geo-location. The event detection system 200 takes into account readings from other geo-locations. The results of the data analysis performed in the event detection system 200 along with the measurements (sensed parameters) can be accessed by the water network operator through the user interface 500, via a web-browser or the like which gives access to the monitoring system 300.

The vast amount of data produced by the sensor units 20 and other devices and components of the water network system can be difficult to interpret or simply not significant in its raw form. Consequently, by analysing this data using event detection algorithms anomalous data sets can be identified at real-time to alert that an event may be in progress. Alongside this, the data can be analysed to provide a greater understanding of the network. This additional analysis enables the data to be more easily interpreted by the user and calculates information that would otherwise require large amounts of manual processing. The user interface 500 informs (or can be interrogated to provide) the network operator of the functionality, status and water quality of the water network system.

The data received from sensor units 20 relates to respective geo-locations and more particularly, usually to in-pipe conditions at that geo-location. The data is processed by the event detection system 200 to detect events and calculate useful metrics and visualisations about the water quality in the water network system 100. Not only does the event detection system provide an indication of the health of the network as a whole but also provides more granular information of the condition of the water network and water quality at various geo-locations where sensor units 20 or other devices are located.

The event detection system 200 takes in water quality measurements (the sensed parameters) from the sensor units 20. The parameters include but are not limited to those outlined in Table I. Alongside these examples are some of the ranges that are commonly seen in water networks however the measurement data is not limited to these ranges and can vary considerably.

The event detection analyser 40 operates on the data in the database DB and has at least the following modules which can each raise events:
Outlier Decay Discriminator (ODD)
    Event Detection
    Threshold breaches
Baseline checks and changes
Spike detection Outlier Decay Discriminator (ODD)

The event detection analyser 40 operates an Outlier Decay Discriminator (ODD). The ODD calculates an outlier probability (Po) for each of the sensed data points based on each data point's measure of abnormality. Embodiments of the invention use a nearest neighbour analysis to determine the measure of abnormality. In embodiments of the invention, the outlier probability is decayed over time. The decay is determined by a decay factor, Fi, which provides a decay profile having a general trend to decrease over time.

The nearest neighbour analysis may be a multivariate nearest neighbour analysis and may use an outlier decay discriminator (MVNN-ODD) algorithm for determining the state of the system based on the sensed data inputs from the water network.

An anomaly (or outlier) is a single point that does not fit in with the normal observed data. An event is a series of anomalous points that indicate the observed media is behaving differently or has changed its properties. The analysis discriminates between anomalies and events based on a decaying of the outliers over time. Embodiments of the invention use the ODD for event detection and threshold breaching in analysing water network data.

Figure 10:
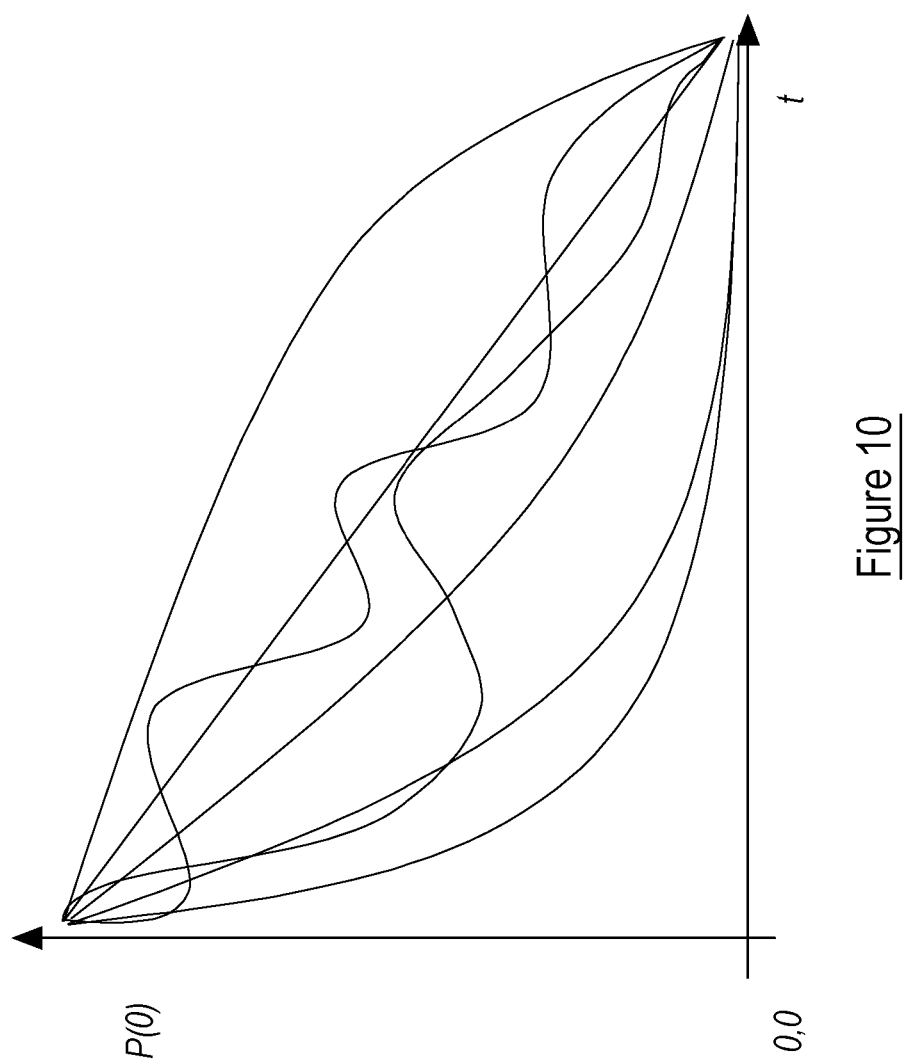
FIG. 10 shows a number of potential decay profiles for use with embodiments of the present invention.

The decay profile can be one or a mixture of any combination of: exponential, linear, polynomial, sinusoidal, reciprocal and/or profiles that vary and decrease over time and/or have a general trend to decrease over time. FIG. 10 shows a number of potential decay profiles for use with embodiments of the present invention.

The manner in which the algorithm is implemented is outlined in the event detection and threshold breaching sections which follow:

i) Event Detection with ODD

Systems embodying the invention analyse the data to establish if an event has occurred. An event is deemed to have occurred when a series of data points are significantly different from the learnt normal values. It should be noted at this point that the majority of water network event detection is often detecting breaches in operating thresholds. However, as much as detecting breaches in operating thresholds is important from a control perspective, it limits the ability to detect other events which occur in water network systems such as pipe bursts, shedding of algal growth (so-called "bio-film incidents") and contamination from outside sources. Detecting breaches in operating thresholds is not effective for such water network events and another approach is required. In such water network events, operational thresholds may not be breached and the events should not be treated in the same way even if there was a threshold breach.

Figure 4:
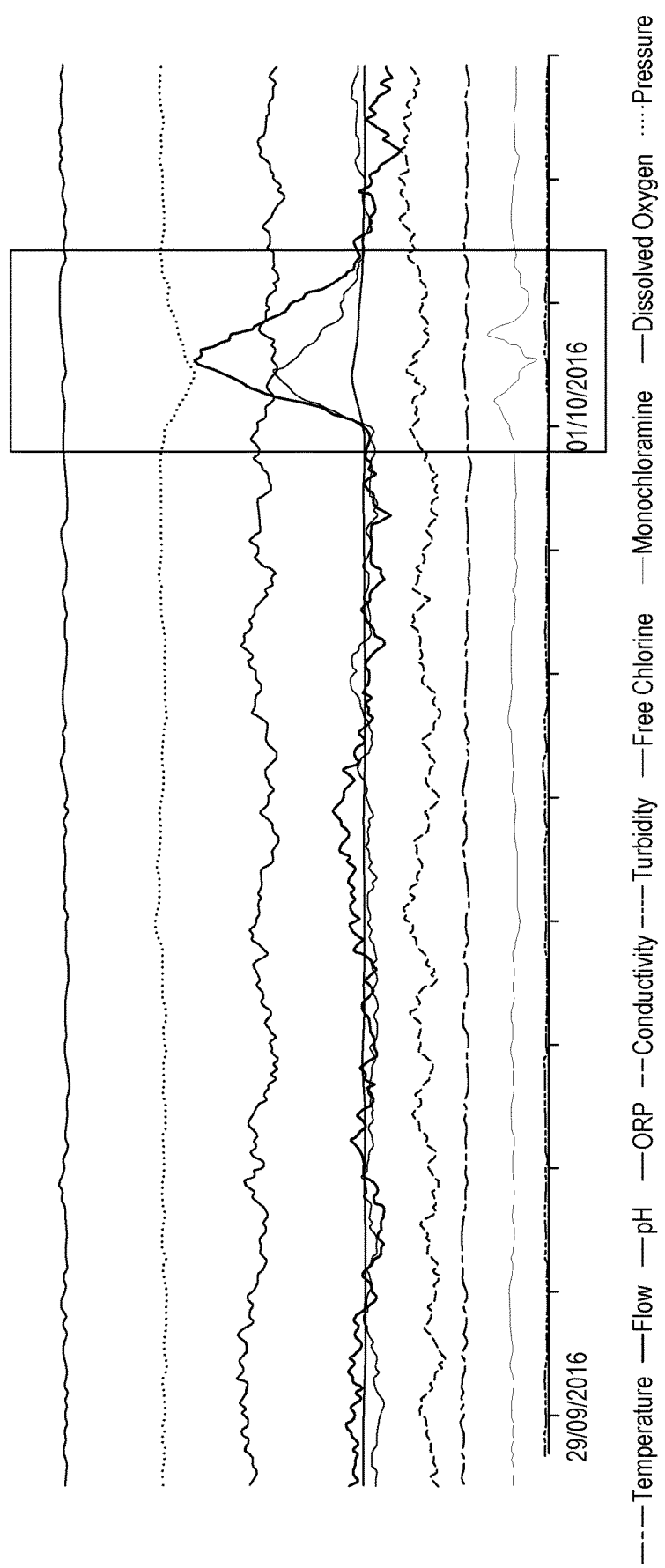
FIG. 4 is an example of an event susceptible of detection by embodiments of the present invention.

Below, in FIG. 4 is an example of an event, this is simulated data based on a real event (which cannot be used for confidentiality reasons). This event involves a sharp rise in free chlorine and flow rate, a drop in pressure and fluctuations in monochloramine, there is also a slight increase in pH; the other parameters behave as normal during this time. Despite the fact that the data returns to normal this is still of interest as it suggests that something has happened to the water, the network managers should be aware of this as it could indicate potential contamination, leakage or any other of the potential issues facing water networks.

The variation of the parameters in FIG. 4 may not be sufficient to breach any thresholds or the thresholds may give false alarms due to the variations in the signal. Consequently, this is where the ODD is effective because it detects these movements because they are significantly different from the signal beforehand. Another advantage is on the monochloramine signal, this fluctuates instead of a constant deviation. This is an example of where the ODD is able to outperform many event detection methods, because the ODD decays the signal it is able to robustly bridge across troughs in the data sets thus avoiding flagging issues that thresholds often encounter. The fact that the monochloramine signal has both positive and negative deviations is also not an issue as the ODD can take this into account by using the magnitude of the deviations and therefore detect them all as the same event.

Figure 5:
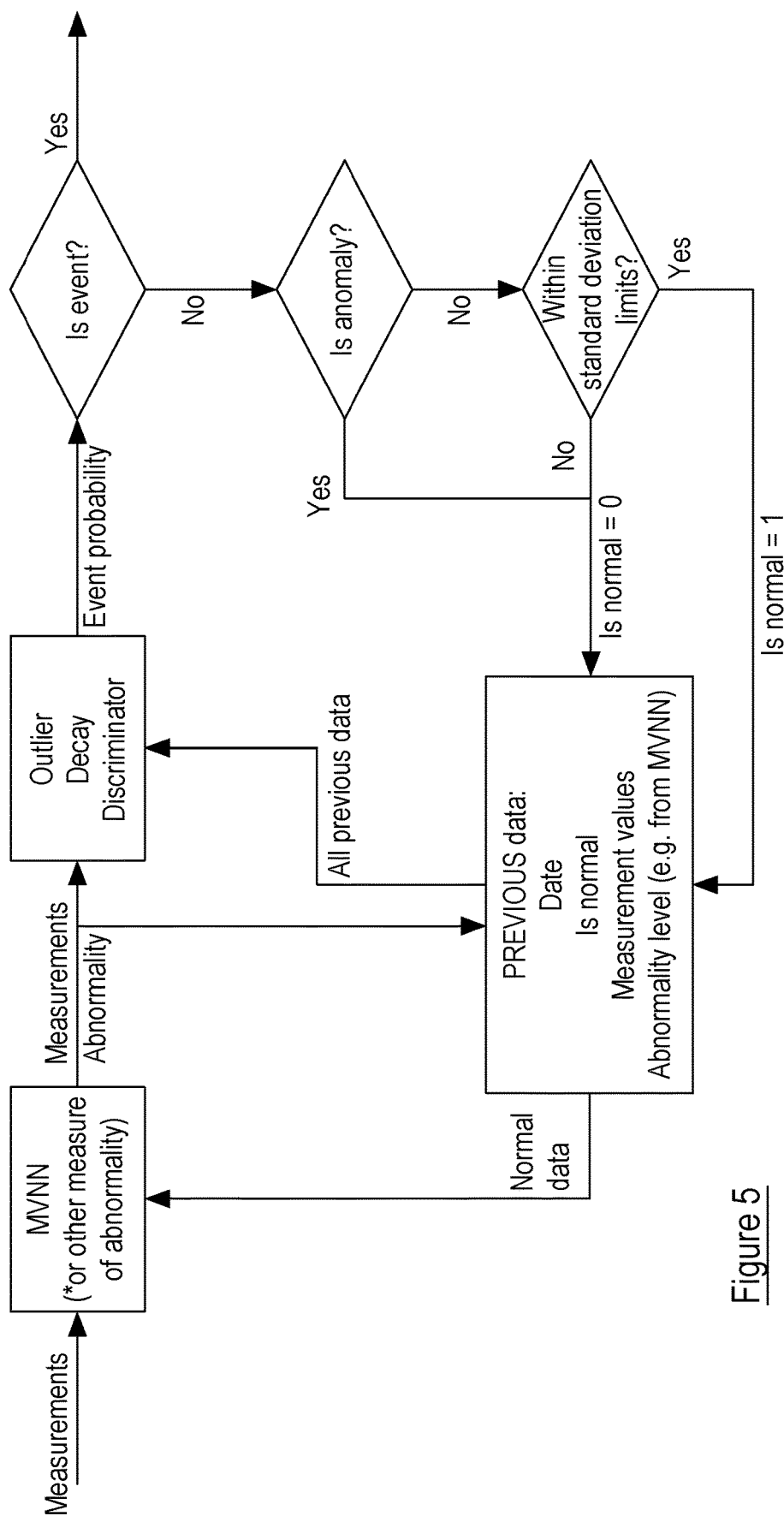
FIG. 5 is a schematic flow diagram showing a method embodying the present invention combining MVNN with ODD to distinguish normal data from anomalies.

In order to detect events, the Outlier Decay Discriminator (ODD) can be attached to another algorithm such as the Multivariate Nearest Neighbour in order to give detection of deviations from the normal (in the case of MVNN, neighbour points that are deemed to be normal)—this is how the event in FIG. 4 would be detected. FIG. 5 is a diagram of how this system operates.

The normal values to compare to in the MVNN algorithm are learnt by comparing the data points to the mean and standard deviation of the sensed parameters from the water network and previous data points that are known to be normal. In the water network, anomalies are taken to be any data beyond a range of standard deviations from the mean and any data beyond that range of standard deviations from the nearest neighbour. This gives a single parameter and multi-parameter check for anomalies when learning normal points. The exact number of standard deviations is a tunable factor which is usually between two (2) and four (4) in the water network environment.

Alongside this, any recorded data points occurring during an event are deemed to be anomalous and are not included in the normal data sets. Consequently, the normal values are learnt with a feedback loop in the system, this means that what the system believes to be normal is based on what it previously believed was normal. This gives the system an ability to adapt to long term changes in the water such as seasonal temperature changes or frequent rapid changes such as multiple water sources that are regularly changed between. The other side of this is that the system is able to filter out frequent events without learning that they are normal, thus making it robust against long periods of unusual data. In practice, in water networks, the data is windowed so that after a period of time (usually between 1 and 3 weeks) the data is removed from consideration by the system.

ii) Threshold Breaches with ODD

Conversely another application of the Outlier Decay Discriminator is to provide a module which allows the event detection analyser 40 to detect threshold breaches. In such a case, the sensed data inputs to the ODD could be a binary value of (1) breaching a threshold or (0) not breaching the threshold, or could be the extent to which the threshold has been breached or any other measure of a threshold breach. The idea of breaching a threshold can be viewed as a measure of how much the data has deviated from an absolute normal, whereby normal is defined as being in between, or one side of, set thresholds. The event detection analyser 40 can apply the ODD to the output of a thresholding algorithm in order to determine whether the threshold is breached.

The advantage of using the ODD in such a way is that, if the water network data sporadically has an anomalous point that crosses the threshold, an alarm is not necessarily raised because the ODD would realise that the previous points have no weighting towards a breach; consequently, the breach probability would not reach a critical level. This approach reduces the likelihood of a false positive event detection. Equally, if a data set repeatedly crosses a threshold in quick succession, for example after four successive data points, then the ODD would remember that the breach had occurred earlier in the data set and would therefore have a higher combined weighting of the data points so would trigger a single alarm, rather than several. The system is aware that several breaches did occur, but the system would only trigger one alarm. That alarm would carry information about the previous events and the alarm could alert the user of the several threshold breaches which occurred earlier in the lead up to the alarm.

Figure 6:
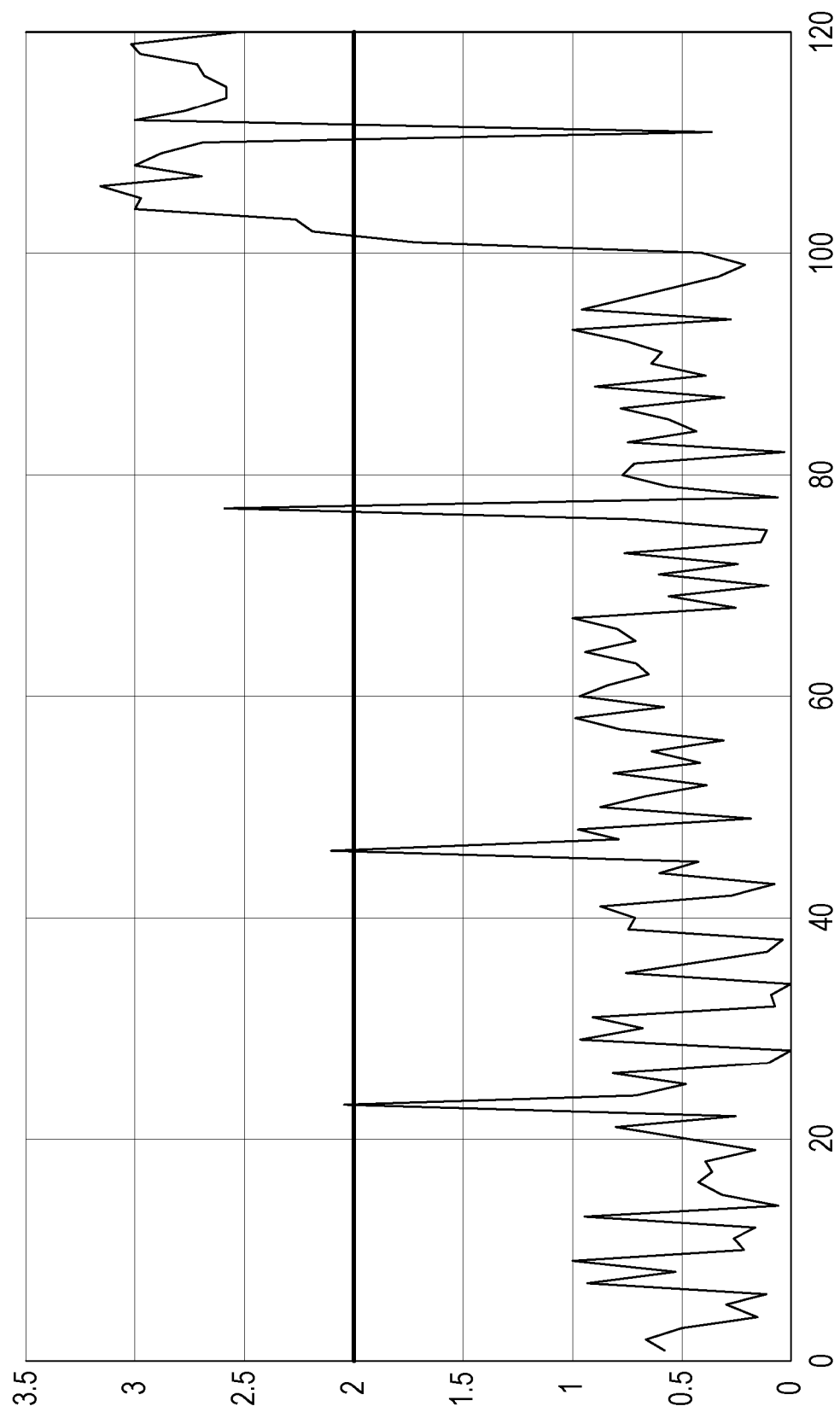
FIG. 6 is an example of sensed data from a water network breaching a threshold.

Referring to the FIG. 6 data and with the event detection analyser 40 using the FIG. 5 combination of MVNN with ODD, the event detection system 200 would ignore the three single spike threshold breaches at times 24, 45 and 77 and handle the data as comprising a single threshold breach starting at time 105. The previous three spikes (at times 24, 45 and 77) would increase the event probability however this would only be marginal and would not reach a probability sufficient enough to deem it an event. Similarly, the drop in the data back to the correct side of the threshold at time 111 would not cancel the event as the ODD probability decays slowly over time, this enables it to span troughs during event data. The recognition by the system of multiple spaced apart threshold breaches as a single event in the water network avoids overloading the system with multiple decision making requirements. The plural discrete threshold breaches are recognised as a single event in the water network.

FIG. 6 also illustrates an embodiment of the system where the three spikes (at times 24, 45 and 77) are not handled as false positives and each spike does not trigger an event state in itself but which triggers when multiple events occur which increase the event probability to a level sufficient to deem an event.

If the data from the water network increases smoothly on approach to the threshold and increases further past the threshold, then the ODD would learn to be very sensitive to the data if the data was near the threshold for a period of time. This is because the past data would have a higher weighting towards there being a breach such that when a breach does occur (i.e. the data moves further past the threshold) the movement is sufficient to create a critical probability and indicate the threshold breach.

The performance of embodiments of the invention utilising the event detection analyser's ODD system was tested on a sample of 140 events that had been selected from a year's worth of data from multiple sites. The sample is not exclusively water network events such as pipe breaks but includes event-like data that had been collected and recognised as being very abnormal. The algorithm of the event detection analyser 40 was found to have a 7% chance of an event being missed and a 3.5% chance that an alert from an event was false. By comparison, an instance of the CANARY water quality event detection software had a 35.3% chance of missing an event and a 63.4% chance that an alarm would be false. The event detection analyser's ODD system makes a significant contribution to event detection performance as well as a dramatic reduction in false alarms and missed events. Implementing the ODD in the event detection modules has provided significant improvements to water network monitors embodying the present invention.

iii) Baseline Changes

The event detection analyser 40 operates a baseline detection module which enables the system to adjust to new baselines in the water quality. Baseline changes in water quality or of sensed parameters in the water network continually occur. Changes can be a result of a sensor unit 20 recalibration, a change in network management or a long-term change in water source, among others. A conventional approach to identifying baseline changes is simply to detect unusual data occurring over a long period of time. In the water network environment such a conventional approach can be less than useful. The "long period of time" can be a few days to over a week. This poses some issues, in that some events (triggered from a now-false baseline) can last a few days and, if the baseline is not adjusted promptly within that few days, the water network monitor is in a continual event-reporting state for an unnecessary length of time.

In order to address this issue, the event detection analyser 40 adopts a different strategy developed from a study of the changes in a number of sensed parameters from the water network and calculated from data over the course of an event and a baseline change. The developed baseline calculation algorithm determines a total probability of the baseline change based on the IQR of the gradient, the standard deviation and the time for a window of data throughout the event.

The performance of embodiments of the invention utilising the event detection analyser's baseline detection function was significantly improved over the conventional approach. The algorithm from the event detection analyser 40 was applied to real-time and historic water network data and has been found to be very effective. The number of false baseline changes have been dramatically reduced and are now rarely seen. The algorithm has also reduced the transition period of the baseline data from several days to just over one day, which, if tuned, could be reduced further. Baseline changes rarely happen but are a particular feature of long-term water quality data and embodiments of the invention which use the baseline change algorithm are more robust at avoiding false baseline changes. This better suits the needs of a water network monitor embodying the present invention, rather than transitioning faster with a greater risk of doing so incorrectly. If the system is tuned to reduce the transition times to less than a day, then this is at the cost of creating a greater risk of false positives which is not desirable in the present embodiment.

iv) Spike Detection

Spike detection is another module in the event detection analyser 40 which is capable of raising an event should a spike be detected. Spike detectors are publicly available modules. Spike detection is used to identify sharp changes in sensed parameters from the water network: pressure and turbidity, for example.

System Structure

Internally, systems embodying the present invention can have a modular structure to allow additional detection and analysis algorithms to be added in as modules without difficulty. The measurements data and settings are read in from the database DB and this is then passed through the following modules:

Multivariate nearest neighbour with outlier decay discriminator (MVNN-ODD):
  Detects events
  Calculates event magnitude
  Identifies outlying parameters
Threshold breaching with ODD:
  Raises an event if a threshold breach occurs on a parameter
  Results passed through the ODD to improve false alarm rates
Spike detection:
  Detects spike events in pressure and turbidity, for example
Baseline checks:
  Using statistical methods to detect whether the event is likely to be a baseline change
  If the probability is high enough, the system will adjust itself for the baseline.

Figure 9:
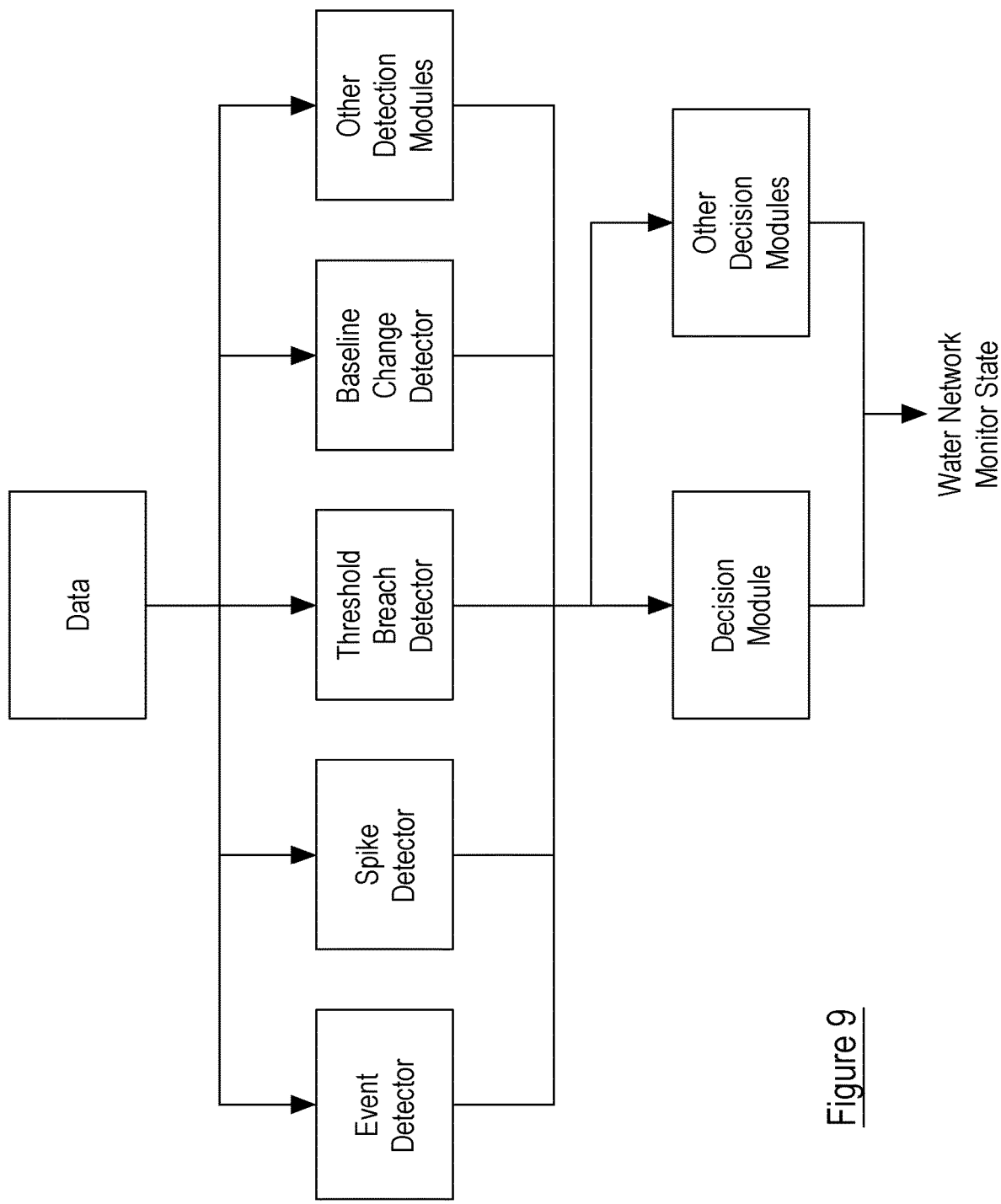
FIG. 9 is a schematic illustration of an event detection system embodying the present invention which has data from the water network as an input and water network state as an output.

Events detected with a sufficient probability are reported from the event detection system 200 to the monitoring system 300. Different modules in the event detection system 200 are each capable of raising an event, for example, see the event detection system 200 illustrated in FIG. 9—which has data from the water network as an input and water network state as an output. The event detection system 200 includes: an event detector 201, a spike detector 202, a threshold breach detector 203; a baseline change detector 204; and other detection modules 205. The detectors or detection modules 201-205 output to one or more decision modules 250, 250' which set the event state of the water network system.

The status of the water network monitor is managed through the one or more decision modules 250,250' which may each set a different form of state. Each module 201-205 capable of raising an event passes the data to the decision module 250,250' with the detection type. The decision module 250,250' combines the outputs of the detection modules 201-205 to determine an event state.

One embodiment of the decision module 250,250' is a decision module where, if any one of the detection modules 201-205 capable of raising an event passes true, then the system enters an event state. Each detection module passes false to the decision module as the detection module no longer deems an event to be in progress. Once all detection modules 201-205 pass false, then an event state is ended. A baseline detection module is the exception; when it triggers a baseline change, all other flags are cleared, the event is tagged as a baseline change and the system readjusts to the new baseline, thus leaving the event state.

Other embodiments of the decision module which operate on different Boolean *desiderata* are envisaged.

The system outputs events occurring at particular locations with the times and with details of what aspects of the sensed data caused the event and any other data analytics that are deduced. This data is all visible to the operator through the user interface 500—for example, a web application through which the customer can assess the information.

The system is capable of re-running through old data, catching up to the current time and progressing with real-time analysis. This enables historical event data to be re-analysed after tuning or re-tuning of the algorithms or the addition of another detection module.

Algorithms i) Multivariate Nearest Neighbour with Outlier Decay Discriminator (MVNN-ODD):

Multivariate nearest neighbour (MVNN) portions are available and commonly used in multivariate analyses. The outlier decay discriminator (ODD) portion is the key to making this algorithm effective as an event detector in a water network system.

The MVNN operates by normalising the data and calculating the distance (Euclidean norm) from the current time. The smallest value is then selected as the result. The equations for MVNN are:

$$z = \frac{x - \mu}{\sigma}; D = \min(\|\hat{z} - z_i\|_{i=0}^{N}) \qquad 1$$

where: x is the data for a given parameter at a given time, p is the mean for that parameter over the window of data, u is the standard deviation for that parameter of the window of data, z is the normalised data, D is the distance (in standard deviations) from the nearest neighbour, N is the total number of parameters considered in the multivariate analysis, $\hat{z}$ is the normalised data at the time which the nearest neighbour is being calculated for.

In order to improve the sensitivity of MVNN only points that are previously found not to be outliers are used in the comparison. This is done by a threshold at 3 standard deviations from its nearest neighbours or by the value on a single parameter being more than 3.6 standard deviations away from the mean, these values were tuned and can be set within the system.

The single variable outlier detection counteracts the tendency of MVNN to be too general in the context of water network systems and not consider movement in one parameter to be significant as it allows for creep in parameters. By marking such data points as outliers, MVNN no longer compares to those points preventing creep and therefore the distance is able to reach a significant level as the parameter deviates further.

ii) Outlier Decay Discriminator (ODD):

The ODD takes an absolute (i.e. non-negative) measure of abnormality, such as the distance from the MVNN algorithm, and uses this to calculate the outlier probability ($P_o$). The probability of a point being an outlier is deemed to be based on the scale of the abnormality which, in the case of MVNN, is the normalised distance from its nearest neighbours (neglecting outliers). This probability will smoothly tend towards 1 as the measure of abnormality, in the case of MVNN, the distance from its nearest neighbours (neglecting outliers) increases. It will also be zero as the distance becomes zero, it is worth noting that the distance will always be positive. The outlier probability distribution can therefore be constructed by multiplying a sigmoid (right) with a statistical correction curve that passes through the origin and also smoothly tends to an asymptote at 1 (left), such that:

$$P_o(X) = (1 - \exp[-\alpha(D - L)]) \times \frac{1}{1 + \exp[-\beta((D - L) - \gamma)]} \qquad 2$$

$$P_o(X) = \frac{1 - \exp[-\alpha(D - L)]}{1 + \exp[-\beta((D - L) - \gamma)]} \qquad 3$$

$$P_o(X) = \frac{1 - \exp[-(D - 4)]}{1 + \exp[-2((D - 4) - 3.5)]} \qquad 4$$

Where D is the measure of abnormality, such as the distance from the MVNN algorithm, L is a threshold offset, α, ρ and γ are all tuning parameters to change the shape of the sigmoid. The sigmoid is one example of a means for defining by its characteristics the abnormality/probability relationship. The sigmoid comprises a characteristic curve. D and L are both measured in terms of standard deviations, as the data has been normalised. Although the use of the sigmoid curve is described above as being multiplied by a statistical correction factor, Appendix A outlines some of the other curves that can also be used in embodiments of the invention to represent the outlier probability, to fit the desired distribution of-the outlier probability. The key property here is that the resulting outlier probability which is constructed fulfils the characteristics of a probability.

The statistical correction factor (or curve) is any curve that, when multiplied by the sigmoid, causes the resulting curve to retain the characteristics of a probability, i.e. the output remains between 0 and 1 for the spanned range of the input parameter.

This example of the invention constructs the outlier probability distribution by multiplying two curves together, this is not the only method that could be used to produce a suitable curve. Indeed the outlier probability needs only to be a probability for it to work, however the exact shape will govern the performance.

The threshold offset, L, is usually set to around 3-4 standard deviations as this filters the abnormality measure, in this example an MVNN distance, to remove variations within the normal region.

The a parameter is referred to as the deformation parameter as this has the impact of reducing the curvature at the top of the sigmoid, thus slowing the approach to the asymptote at 1 as the distance, D, increases. After tuning the sigmoid a value of 1 works well for a in the water network environment.

The β parameter controls the gradient of the sigmoid thus defining how rapidly or smoothly the probability steps up—this is tuned to a value of 2 for the water network environment.

Finally, γ controls the pivot point of the sigmoid, more specifically the distance at which the step occurs. This is referred to as the pivot because the middle point of the sigmoid step does not change with the value of β so this is an easier reference point and changing the gradient pivots the sigmoid about the mid-point, although it can shift with the deformation factor. Tuning this to 3.5 as the value for γ works well for the water network environment.

Other measures of outlier probability are possible where the output remains between 0 and 1 for the spanned range of the input parameter—any curve or constructed distribution which meets this criteria can be used. Thus, this generalises to a measure of outlier probability by a curve or constructed distribution. Another form of equation 2 which can be used in other embodiments of the invention neglects the threshold offset L to give:

$$P_o(X) = \frac{1 - \exp[-D]}{1 + \exp[-\beta(D - \gamma)]} \qquad 5$$

Where β and γ are tunable parameters, whereby a value of β=2 and γ=3.5 works well on water network data.

The probability of an event will be based on the probability that the preceding points are outliers. As these points become further back in time they will have less influence on the probability that an event is in progress. Therefore, the outlier probability is decayed over time by a negative exponent of the elapsed time since the point was recorded (see appendix A). A decay factor, decays the outlier probability over time. The decay factor provides a decay profile which can include one or any mixture of: exponential, linear, polynomial, sinusoidal, reciprocal or any number of profiles or curves that vary and preferably decrease over time and have a general trend to decrease over time—see examples of decay profiles for different decay factors $F_1$ in FIG. 10.

For example, the sinusoidal profile could be modulated/superimposed on the exponential profile to yield a hybrid decay profile.

Embodiments of the present invention work particularly effectively in the water network environment when utilising decay profiles which have a general trend to decrease over time. Conversely, an outlier probability that steps instantaneously from zero (0) to one (1) alongside a decay profile that steps instantaneously from one (1) to zero (0) does not yield useful data to effectively monitor a water network system.

For water network sites that experience a periodicity to their data (i.e. multiple water sources), a sinusoidal relationship can be used. The sinusoidal relationship can be combined with another decay profile (for example a linear decay profile) to create a relationship sensitive to periodic data, but retaining the emphasis on more recent data.

A decay factor that works well with embodiments of the invention is:

$$F_i = \exp\left[-\frac{(t_n - t_{n-i})\lambda}{t_{n-i} - t_{n-i-1}}\right] \quad 6$$

The preferred range of the tuning parameter lambda (λ) for this and other instances is 0.1-0.5. The denominator of the exponent is the distance between the historical data point and its predecessor. This allows the factor to adjust to changing time-steps or large data gaps without increasing or decreasing influence. It is possible to keep this as the expected time step of the data or to neglect it entirely, and theoretically that would seem intuitive as the decay is therefore solely based on time, however in practice we have found better performance with the adaptive factor as it allows for inconsistent data sets and data gaps without losing the influence of significant points. Also, the frequency of points can lead to a need to retune the system if the factor is not adaptive, although this can also be addressed by adjusting for point density later, the adaptive factor is the easiest way to adjust for this.

To combine the probabilities there are a number of possible options, the first would be to use a normalisation condition to introduce a factor that enables the sum of the probabilities to be taken and result in a probability. The factor could be a constant based on the number of points but that would result in the reduction of the bias towards more recent points.: The factor that would therefore make the most sense would be based on the decay amount which would therefore take into account the fact that some points have very low probability due to the elapsed time since they occurred. Therefore, using such a factor would result in the following equations for the probability of an event:

$$\eta = \frac{1}{\sum_0^N F_i} \quad 7$$

$$P(\text{event}) = \eta \cdot \sum_{t=0}^{N} P_o(X_t)F_t \quad 8$$

This approach follows a theoretical interpretation of how anomalies are related to events. However, another approach to take is to see the outlier probabilities once they have been decayed as merely being a factor that contributes to the event, this approach instead sums the probabilities (without the normalisation condition) and passes the result through another sigmoid. This view is similar to the idea of each time point being an input node in a two-layer neural network (simple perceptron). The measure of abnormality, in this example, the distance from MVNN, at the node is the input (D), this is then thresholded (via equation 3) to give the output of the first neuron layer ($P_o$). The nodes are then connected to the decision node by a time-dependent weight (the decay factor, $F_i$), the inputs to the decision node are therefore all summed and thresholded to give the final event probability, P(event). Taking this approach gives the event probability as below, where δ, ε and ζ are tuning parameters.

$$\Psi = \sum_{t=0}^{N} P_o(X_t)F_t \quad 9$$

$$P(\text{event}) = \frac{1 - \exp[-\delta\Psi]}{1 + \exp[-\varepsilon(\Psi - \zeta)]} \quad 10$$

Figure 11:
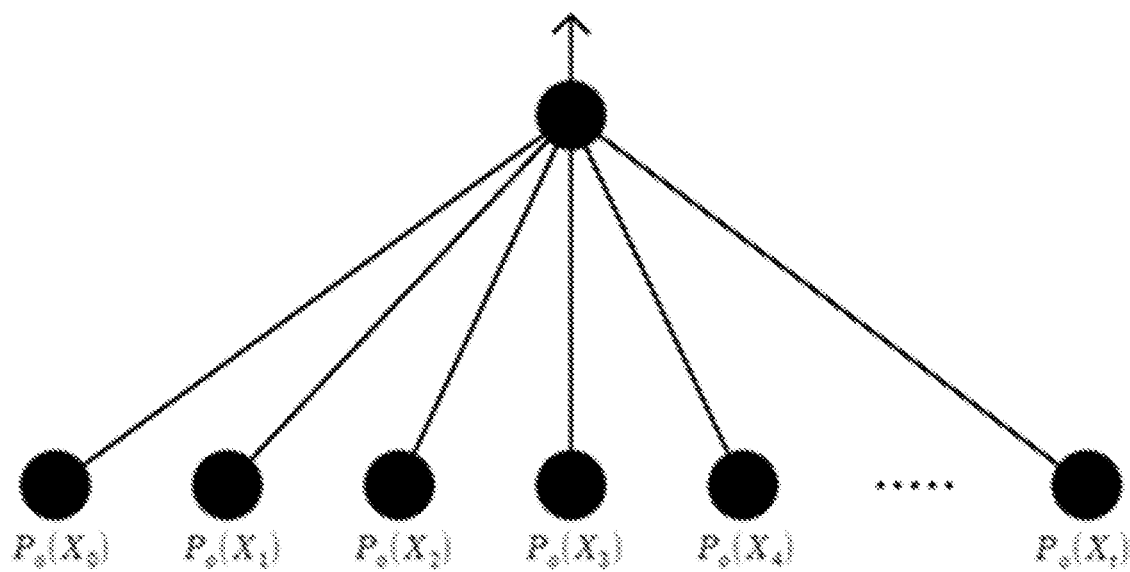
FIG. 11 shows a node tree describing an example final event probability.

The tuning parameters δ, ε and ζ preferably have tuning ranges as follows, around:
Δ—Delta [2.5-3.5]
ε—Epsilon [2.5-4.5]
ζ—Zeta [1-2.5]
With reference to FIG. 11, a specific example would be:

$$P(\text{event}) = \frac{1 - \exp[-2.5\Psi]}{1 + \exp[-3.9(\Psi - 2)]} \quad 11$$

$$P(\text{event}) = \frac{1 - \exp[-\delta\Psi]}{1 + \exp[-\varepsilon(\Psi - \zeta)]}$$

$$\Psi = \sum_{t=0}^{N} P_o(X_t)F_t$$

$$F_i = \exp\left[-\frac{(t_n - t_{n-i})\lambda}{t_{n-i} - t_{n-i-1}}\right]$$

$$P_o(X) = \frac{1 - \exp[-\alpha(D - L)]}{1 + \exp[-\beta((D - L) - \gamma)]}$$

Consequently, we end up with what could be considered as a specialisation of the simple perceptron by using an infinite number of input nodes, one for each time step, and using a single-sided thresholding function rather than the traditional threshold used by Artificial Neural Networks (ANNs). The ANN weights are instead time-decay weights to link the decision node to the inputs. The key difference here is that the hyper parameters from the ANN are massively reduced in number so this is less of a parametric model and more one based on intuitive relationships. Consequently, this specialisation requires tuning of up to 8 parameters to fit the data, but does not require training of the model to fit the data sets. This specialisation is an interesting application for ANN-like structures given that ANNs are primarily used for feature recognition, function approximation, associative memories and optimisation, therefore analysing time-series data to determine states is not a common application.

Whilst the approach used with Equation 10 is preferred, Equation 8 could also be used in place of Equation 10. Example Pseudo-Code:

```
//-------------------- MVNN ALGORITHM --------------------//
Container distances;
FOR ALL NORMALISED DATA AT TIMES IN WINDOW
{
    if (data_iterator IS OUTLIER)
    {
        continue;
    }
    distances.store(euclidian_norm(data_now, data_iterator));
}
min_distances.store(min(distances));
//-------------------- ODD ALGORITHM --------------------//
Container outlier_probabilities;
FOR ALL MIN_DISTANCES
{
outlier_probabilities.store (outlier_probability_eqn(min_distance_iterator));
}
Value decay_sum;
FOR ALL OUTLIER_PROBABILITIES
{
    decay_sum += decay_factor(time of outlier) * outlier_prob_iterator
}
event_probability = event_probability_eqn(decay_sum);
```

Threshold Breaching with ODD

Using the structure of the ODD used in the event detector it is possible to adjust the application to threshold breaching. This application is useful as in the water industry the regulation limits of certain parameters are thresholds, equally a large number of the control processes are based around thresholds.

In order to modify the ODD to perform threshold breach discrimination the outlier probability is instead based on a measure of how far past the threshold the signal has gone, in the extremes this would set the outlier probability to 1 upon crossing the threshold. Otherwise, the outlier probability is calculated from a distribution as before, whereby D is the distance past the threshold. The rest is kept the same as before.

This is done for each threshold, therefore the implementation is fairly complex and requires handling of upper and lower thresholds as well as different threshold types, such as those set internally, those set for operations and those set by regulators at each level. This lends itself to a complex data structure to store the breach information in and a reasonably complex handling of the data in the system.

Spike Detection

With water quality data, it is common for some parameters to operate on a different time-scale to others. Specifically, turbidity and pressure often have far faster changes in values than pH or other chemical factors. This means that the sampling rate of water quality parameters can lose some of the detail of turbidity and pressure spikes, such as their peak values. The effect of losing the resolution on these fast changing parameters is that an event appears as a single anomalous point. Event detection algorithms usually attempt to avoid triggering on a single anomaly, as this would give too many false alerts, however in this case the trigger is desired. Consequently, the intelligence system has a module attached to it that triggers an event on spikes in turbidity and pressure, more specifically if the data point is more than a given threshold value (in standard deviations) away from the mean. This threshold can be tuned however a value of 8 has been found to be effective for many of our data sets.

The turbidity and pressure can become very flat and therefore get a very low standard deviation, to avoid this then triggering an event on very small spikes, a minimum standard deviation can be set. This effectively sets the thresholds with a minimum change in value, thus allowing them to be tuned more flexibly. The spike detection is only applied to these two parameters as they are the ones identified to be prone to under-sampling, giving aliasing problems, however application to other parameters is possible if needed.

Baseline Detection

In order to address the detection of baseline changes and, more specifically, distinguishing them from events, an algorithm was constructed to calculate the probability of an event being a baseline change—the Conditional Metadata Probability method.

The method used to find the probability of a baseline change was constructed from looking at the difference in shape. An event is usually fairly triangular in shape, it increases before then decreasing again, or they have movement of the parameters with large swings in, the values; however common to almost all events is that the parameters move around a lot with little consistency in value.

A baseline change, on the contrary, has different characteristics to an event. A baseline change often has a large change in parameters but these then settle down to a similar level of variation as before the change.

This difference led to an investigation of calculated values before and during an event to see which had the largest difference between baseline changes and events, using previously collected data. These calculated values were:

Sum of gradients—adding the gradient over the course of the event. For an event, this is triangular in shape but for a baseline change this is more of a step that levels off.

Area under event—Summing the area underneath the event. Levels off for an event, continually climbs (or drops) for a baseline change.

Mean likelihood—Calculating the mean before the event and assessing the how likely it is to be the mean of the' data set. When an event occurs, calculate the mean of the event and assess its likelihood again. If using a window, the likelihood of the mean should be higher for a baseline change than for an event (assuming constant standard deviation).

Standard deviation—Calculating the standard deviation in a window throughout the event and comparing to the pre-event standard deviation. For a baseline change, this should become similar whereas for an event it will stay higher.

Inter-quartile range (IQR)—Calculating the inter-quartile range before and during an event and comparing the two. A baseline change should have a similar IQR to before the event, whereas an event should have a larger IQR.

Inter-quartile range of the gradient—as before but using the gradient of the data rather than the data itself. Depending on the method of the gradient calculations this gives a slightly reduced noise level. It also emphasises changes, for example a spike in the data corresponds to a spike up and a spike down in the gradient, thus making range calculations more sensitive.

The investigation into the changes of these calculated values over the course of the events and the baseline changes showed that the inter-quartile range (of the signal or gradient) and standard deviation had the largest overall differences. Another key factor to note was that the time required for an event to develop differences from a baseline change meant that time also had to be considered as a factor. From this background, the algorithms for calculating the probability of a baseline change were found to be best when using these three factors.

It was therefore decided that the baseline change probability was best modelled as a total probability of the baseline change given the time, the standard deviation and the gradient. IQR. The conditional probability for time is thought to be best modelled by a sigmoid-like curve, stepping gradually from 0, at time 0, and tending to 1 as time increases (see appendix A for notes on the equations chosen).

This step should reach a high probability after enough time for the event to have become distinguishable between an event and a baseline. This gives the equation for the baseline probability given the elapsed time (in seconds) as:

$$P(b|t) = \frac{1 - \exp[-\alpha t]}{1 + \exp[-\beta(t - \gamma)]} \qquad 12$$

The tuning parameters $\alpha$, $\beta$ and $\gamma$ preferably have tuning ranges as follows, around:
  $\alpha$—[1e-5 to 5e-5]
  $\beta$—[0.1e-4 to 1e-4]
  $\gamma$—[43,000 to 604,800]

The equations for the baseline probability given the standard deviation and gradient IQR are thought to step down from a probability of 1, when the difference between the pre-event and event metadata is 0, to tend to zero probability as the difference increases (see appendix A). This is modelled by the following equations:

$$P(b|\sigma_e) = 1 - \frac{1 - \exp[-\alpha|\sigma_e - \sigma_{normal}|]}{1 + \exp[-\beta(|\sigma_e - \sigma_{normal}| - \gamma)]} \qquad 13$$

The tuning parameters $\alpha$, $\beta$ and $\gamma$ preferably have tuning ranges as follows, around:
  $\alpha$—[2 to 5]
  $\beta$—[2 to 5]
  $\gamma$—[1.5 to 5]

$$P(b|r_e) = 1 - \frac{1 - \exp[-\alpha|r_e - r_{normal}|]}{1 + \exp[-\beta(|r_e - r_{normal}| - \gamma)]} \qquad 14$$

The tuning parameters $\alpha$, $\beta$ and $\gamma$ preferably have tuning ranges as follows, around:
  $\alpha$—[2 to 8]
  $\beta$—[10 to 20]
  $\gamma$—[0.2 to 0.8]
  Where:
    $r_e$=gradient IQR during event
    $r_{normal}$=gradient IQR pre-event
    $\sigma_e$=standard deviation during event
    $\sigma_{normal}$=standard deviation pre-event With these three conditional probabilities and the law of total probability, the probability of the baseline change can be modelled as:

$$P(b|t \wedge \sigma_e \wedge r_e) = P(b) = P(b|t) \times P(b|\sigma_e) \times P(b|r_e)$$

In practice, the standard deviation and gradient IQR are calculated over a windowed period such that when the time probability reaches a high probability they no longer take into account the initial period of large changes as is common with baseline changes.

The baseline probability is thresholded at 0.9 to trigger a baseline change. With tuning the method gives a minimum time to baseline change of about 36 hours. The only variables considered in the calculations are those above the outlier threshold for the last four time-steps. This ensures that a single anomalous point in another variable does not affect the baseline probability. The conditional probabilities are calculated for each of the outlying variables and an average taken before calculating the baseline probability.

APPENDIX A—EQUATIONS

The use of the sigmoid-like functions in the Outlier Decay Discriminator and in the Baseline change probability calculations is only one of a few equations that could be used in either case. For example, the following families of curves could all be used:

$$a^{-\frac{1}{t}};\ 1 - a^{-t};\ \frac{1}{1 + a^{-t}};\ \tanh(t)$$

The main characteristic is that the relationship must have a curve with an asymptote at 1 as the variable tends to infinity, although a step from 0 to 1 at a given time could also be appropriate for modelling the baseline change or ODD thresholds. Another approach could be to use a polynomial curve with a cut off at a certain value, such that when the value exceeds 1 it becomes set to 1, such a method would also fit the problem.

For the baseline change calculations, whether the probability is zero at a time of zero is not the key characteristic of the relationship, since the time aspect of the baseline change is a control to prevent the system from having too much confidence in its decisions when it has insufficient data to decide. From our investigations into the baseline change equations the sigmoid shaped equation (10) had the smoothest and most reliable behaviour.

For the ODD, the single-sided sigmoid-like equation was chosen as it was found to be by far the most superior in terms of event detection performance as it was able to be tuned easily, produced few false events and was found to detect almost all events that we tested it on, with additional tuning this performance increased further.

The decay curve used by the ODD to produce the weighting factor (equation 5) was chosen as it had the most desirable characteristics. The rapid initial decay prevents the most recent points having too much influence, but the gradual mid to long term decay means a tendency for the data to be event-like makes the ODD more sensitive as the factors still allow an influence from more historic data. However, other curves could be used for this time-decay relationship, for example a linear or polynomial decrease with a cut off after a certain period of time would serve well if tuned correctly. The positive tail of a bell curve or a stepping down sigmoid-like or threshold function would also serve well if tuned, these would result in a greater weight on more recent points so would make it more sensitive to short term trends. Our experience of these curves was that they responded too quickly to short anomalous spikes, and thus caused more false events.

The present invention relates to a water network monitoring system and method. The examples described above are specific to water networks and the multiple sensor input parameters, algorithms, functions, equations, weightings and other parameters and variables which have been tuned for application to water networks so that the tuned system delivers outputs which are technically effective for a water network environment, in that the system output is reliably indicative of an event occurring in the water network, for example. The same or similar input parameters, algorithms, functions, equations, weightings and other parameters and variables may be applied to other non-water network environments. Examples of other environments or systems having operating parameters which can be monitored (not water networks) where the same or similarly tuned systems may offer effective outputs are:

Electrical Distribution, Power Network, Power Grid:
In an electrical distribution network, power network and/or power grid, such as the national grid, the system could be deployed to monitor: Voltage (V), current (A), actual power (Watts), apparent power (kVA), frequency (Hz), phase rotation (degrees), temperature (° C.), wind speed (m/s), humidity (%).

Electrical Distribution and Electric Vehicle Charging Network:
In an electrical power network which includes charging points for electric and/or hybrid electric vehicles, the system can be monitored in a manner analogous to the described water network system. As well as monitoring Voltage (V), current (A), actual power (Watts), apparent power (kVA), frequency (Hz), phase rotation (degrees), temperature (° C.), wind speed (m/s), humidity (%), embodiments of the monitoring analyser and system can also take data inputs from vehicles being charged at charging points around the network; vehicles connected to the network having excess charge and capable of returning charge to the grid. Such networks would also be monitored for vehicle operating parameters (see below) and history, parameters indicating energy consumption, energy consumption profiles and the like. An electrical distribution and electric vehicle charging network monitoring system uses the same or similarly tuned systems as the water network monitoring system to deliver effective outputs.

Swimming Pools, Aquariums, Private Plumbed Networks:
These could include but not limited to, water parks, swimming pools, hospitals, university campuses, aquariums. Same as Table I, perhaps with potential additional parameters such as ozone ($O_3$) or salinity.

RF Networks:
These could include but not limited to satellite links, point-to-point microwave links, point-to-multipoint microwave links.

Received signal strength (dBmW), error rate (%), temperature (° C.), load capacity (%), effective throughput (bit/s), humidity (%), power supplies (V, A, W, kVA), contact inputs (i.e. switches etc.)

Gas Distribution:
Gas distribution networks could monitor:
Humidity (%), Calorific content (kJ/kg), Pressure (Pa), Volumetric flow rate ($m^3/s$), Flow speed (m/s), Clarity/turbidity.
Potential chemical components: Carbon Dioxide, Carbon Monoxide, Nitrogen, Oxygen, Methane, Sulphides, Hydrogen, Air Conditioning/Heating Systems:
Large buildings and industrial units may have extensive and crucial air conditioning or heating systems (for example in server rooms, hospitals etc.) that require monitoring. Examples of sensed parameters could be: Humidity (%), Temperature (° C.), Pressure (Pa), volumetric flow ($m^3/s$), flow speed (m/s), clarity/turbidity, contact alarms, power supply (V, A, W, kVA, Hz).

Aviation/Automobile/Ships/Trains Monitoring:
Engines and Mechanical Monitoring of Vehicles and Transport.
Many vehicles have a large number of sensors and relay these to a central console. This could allow a system such as ours to be deployed to use the built-in sensors to detect the health of the vehicles and relay these back to a central system. This could be very useful for train/tram operations, bus companies, Logistics companies, Aircraft manufacturers/companies, Domestic use. Examples of the sensed parameters could be:
Engine pressure (Pa), ignition point (degrees), engine temperature (° C.), engine revs (RPM), exhaust pressure (Pa), vehicle ride height (m), engine acoustics (dB), oil level (litres), oil pressure (Pa), oil temperature (° C.), oil turbidity (NTU), fuel turbidity (NTU), intake air pressure (Pa), intake air volumetric flow ($m^3/s$), fuel usage ($m^3/s$), oil usage ($m^3/s$), tyre pressure (Pa), brake fluid pressure (Pa), clutch wear (m), electrical systems (V, A, kVA, W, Hz).

Process Control Systems:
These could include but not limited to, food processing, manufacturing, raw materials processing, bulk material processing, etc. Examples of the sensed parameters could be:
Power supplies (V, A, kVA, W, Hz), contact alarms, volumetric flow. ($m^3/s$), mass flow (kg/s), humidity (%), temperature (° C.), dimensions (m) (i.e. using laser distance sensors), defects (i.e. colour, hardness, acoustic, shape), chemical constituents.

However, the ODD algorithm itself could be used to assess the state of any source of data.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A water network monitoring system comprising:
at least one sensor, wherein the at least one sensor is at least one of configured for immersion within water of a water network or configured to receive samples of the water of the water network, and the at least one sensor is operable to sense one or more parameters from the water of the water network; and
an analyser comprising a processor, the analyser configured to analyze data points recorded over time from the water network by the at least one sensor, the analyser having an input comprising the data points recorded over time from the water network and an output comprising an event probability $P_{(event)}$ that an event has occurred which affects the water network from which the data points were recorded, the analyser comprising:
an outlier detector to determine a measure of abnormality (D) from an outlier detection algorithm for each of the data points; and
an outlier decay discriminator (ODD) to calculate an outlier probability ($P_o$) for each of the data points based on each data point's measure of abnormality (D), wherein the outlier probability is decayed over time, the output of the ODD comprising the event probability $P_{(event)}$, wherein $P_{(event)}$ is based on a sum of the decayed outlier probabilities of the data points recorded over time.

2. The system of claim 1, wherein the decay is determined by a decay factor, $F_t$, which provides a decay profile having a general trend to decrease over time.

3. The system of claim 2, wherein the P(event) is given by:

$$P(\text{event}) = \eta \cdot \sum_{t=0}^{N} P_o(X_t) F_t,$$

where $$\eta = \frac{1}{\sum_{0}^{N} F_t}.$$

4. The system of claim 1, wherein the data is substantially real time and the outlier probability ($P_o$) for each of the data points is decayed over time since the data point was recorded.

5. The system of claim 1, wherein the outlier probability ($P_o$) for each of the data points is decayed over time within a predetermined time window.

6. The system of claim 1, wherein the analyser further comprises one or more decision nodes to enter an event state based on the calculated event probability $P_{(event)}$ that an event has occurred or is about to occur.

7. The system of claim 1, further comprising an alert and action system operable to alert or take action in response to entering an event state.

8. The system of claim 1, wherein an event comprises an event within the water network system being monitored or an event outside the water network system, which event causes a measurable change in one or more parameters of the water network system.

9. The system of claim 1, wherein the data points are data of technical parameters of the water or the water network sensed from the water network monitoring system.

10. The system of claim 9, wherein the sensed parameters include or relate to any one of or any combination of: Temperature, Flow (volume or speed), pH, Oxidation Reduction Potential (ORP), Conductivity, Turbidity, Free Chlorine, Mono Chlorine, Monochloramine, Dissolved Oxygen, Pressure, fluoride, nitrate, nitrite, ammonia/ammonium, total chlorine, chlorine dioxide, chloride, chlorite, chlorine, Iron, manganese, Arsenic, Copper, Cyanide, Lead, Nickel, Mercury, TOC, TIC, biCarbonate Hardness, TDS, Bio-organisms including *E coli, streptococcus* (bacteria, parasites), Biofilm, *cryptosporidium*, Radioactivity.

11. The system of claim 1, wherein the outlier probability ($P_o$) is:

$$P_o(X) = (1 - \exp[-\alpha(D - L)]) \times \frac{1}{1 + \exp[-\beta((D - L) - \gamma)]}$$

$$P_o(X) = \frac{1 - \exp[-\alpha(D - L)]}{1 + \exp[-\beta((D - L) - \gamma)]}$$

$$P_o(X) = \frac{1 - \exp[-(D - 4)]}{1 + \exp[-2((D - 4) - 3.5)]}$$

where:
D is a distance from a multivariate nearest neighbour (MVNN) algorithm,
L is a threshold offset,
α, β and γ are all tuning parameters to change a shape of a characteristic curve, and
D and L are both measured in terms of standard deviations, as the data has been normalised.

12. The system of claim 1, wherein the P(event) is given by:

$$P(\text{event}) = \frac{1 - \exp[-\delta \Psi]}{1 + \exp[-\varepsilon(\Psi - \zeta)]},$$

where $$\Psi = \sum_{t=0}^{N} P_o(X_t) F_t$$

and tuning parameters δ, ε and ζ have tuning ranges:
δ—Delta [2.5-3.5]
ε—Epsilon [2.5-4.5]
ζ—Zeta [1-2.5].

13. The system of claim 1, wherein the analyser is configured as one or more of: an event detector, a spike detector, a threshold breach detector or a baseline change detector.

14. A system comprising an analyser comprising a processor, the analyser configured to analyze data points recorded over time from a water network system, the analyser having an input comprising the data points recorded over time from at least one sensor at least one of configured for immersion within water of the water network system or configured to receive samples of the water of the water network system and an output comprising an event probability $P_{(event)}$ that an event has occurred which affects the water network system from which the data points were recorded, the analyser comprising:
  an outlier detector to determine a measure of abnormality (D) from an outlier detection algorithm for each of the data points; and
  an outlier decay discriminator (ODD) to calculate an outlier probability ($P_o$) for each of the data points based on each data point's measure of abnormality (D), wherein the outlier probability is decayed over time, the output of the ODD comprising the event probability $P_{(event)}$, wherein $P_{(event)}$ is based on a sum of the decayed outlier probabilities of the data points recorded over time.

15. A system according to claim 14 in combination with a baseline change detector:
  wherein the output of the analyser comprises a baseline change indicator; and
  the system comprises a calculator to calculate a probability of a baseline change based on monitoring the data points over time comprising one or more of: an inter-quartile range (IQR) of the data points; an inter-quartile range (IQR) of a gradient of the data points; or a standard deviation of the data points, wherein the baseline change probability comprises a probability calculated from a combination of the time and one or more of the standard deviation, the gradient IQR or the IQRs.

16. The system of claim 15, wherein the baseline change probability is a total probability of the conditional probabilities calculated from the gradient IQR, time and standard deviation.

17. The system of claim 15, wherein a baseline change indicator is triggered when the baseline change probability exceeds a threshold.

18. The system of claim 15, wherein a total baseline probability given an elapsed time is:

$$P(b|t) = \frac{1 - \exp[-\alpha t]}{1 + \exp[-\beta(t - \gamma)]},$$

where tuning parameters $\alpha$, $\beta$ and $\gamma$ have tuning ranges:
  $\alpha$—[1e-5 to 5e-5]
  $\beta$—[0.1e-4 to 1e-4]
  $\gamma$—[43,000 to 604,800].

19. The system of claim 15, wherein, the standard deviation and the gradient IQR are calculated over a windowed period such that when a time probability reaches a probability they no longer take into account an initial period of changes.

20. A method of monitoring a water network system comprising:
  using a processor of an analyzer to perform operations comprising:
    recording data points over time from at least one sensor that is at least one of immersed within water of a water network system or configured to receive samples of the water of the water network system;
    determining a measure of abnormality (D) from an outlier detection algorithm for each of the recorded data points;
    calculating an outlier probability ($P_o$) for each of the recorded data points based on each data point's measure of abnormality (D);
    decaying the outlier probability for each data point over time; and
    outputting an event probability $P_{(event)}$ that an event has occurred which affects the water network system from which the data points were recorded, wherein $P_{(event)}$ is based on a sum of the decayed outlier probabilities of the data points recorded over time.

21. A non-transitory computer readable medium carrying a set of instructions for carrying out the method of claim 20.

* * * * *